United States Patent
Mukai

(10) Patent No.: US 9,873,577 B2
(45) Date of Patent: Jan. 23, 2018

(54) IMAGE READING APPARATUS HAVING FIRST MOTOR FOR ROTATING FEED ROLLER, AND SECOND MOTOR FOR ROTATING CONVEYANCE ROLLER AND REVERSE ROLLER

(71) Applicant: BROTHER KOGYO KABUSHIKI KAISHA, Nagoya, Aichi (JP)

(72) Inventor: Takaaki Mukai, Iwakura (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 15/232,078

(22) Filed: Aug. 9, 2016

(65) Prior Publication Data

US 2017/0050812 A1 Feb. 23, 2017

(30) Foreign Application Priority Data

Aug. 17, 2015 (JP) .................................. 2015-160702

(51) Int. Cl.
| | |
|---|---|
| *B65H 3/46* | (2006.01) |
| *H04N 1/203* | (2006.01) |
| *H04N 1/00* | (2006.01) |
| *B65H 5/06* | (2006.01) |
| *B65H 7/14* | (2006.01) |

(52) U.S. Cl.
CPC ............. *B65H 3/46* (2013.01); *B65H 5/062* (2013.01); *B65H 7/14* (2013.01); *H04N 1/00588* (2013.01); *H04N 1/00602* (2013.01); *H04N 1/00702* (2013.01); *H04N 1/00748* (2013.01); *H04N 1/00779* (2013.01); *H04N 1/2032* (2013.01); *B65H 2403/72* (2013.01); *H04N 2201/0081* (2013.01)

(58) Field of Classification Search
None
See application file for complete search history.

(56) References Cited

U.S. PATENT DOCUMENTS 5,267,059 A * 11/1993 Kawabata ............ H04N 1/0057
358/474
9,637,333 B2 * 5/2017 Kuriki .................... B65H 3/063
(Continued)

FOREIGN PATENT DOCUMENTS

| JP | 2008-271388 A | 11/2008 |
|---|---|---|
| JP | 2012-111565 A | 6/2012 |

*Primary Examiner* — Thomas D Lee
(74) *Attorney, Agent, or Firm* — Scully, Scott, Murphy & Presser, PC

(57) ABSTRACT

In an image reading apparatus, in a first process, first and second motor rotate feed and conveyance rollers with circumferential speeds of first and second speeds, respectively. In the first process, the reverse roller has a first separation performance for separating a sheet from another sheet. In a second process, after a detector detects a leading edge of the sheet, the controller stops the first motor, and decelerates the second motor, and the reverse roller has a second separation performance lower than the first separation performance. In a third process, after a trailing edge of the sheet reaches a specific position, the first motor starts rotating the feed roller with the circumferential speed of the first speed. In a fourth process, after the trailing edge of the sheet passes through a reading end position, the controller accelerates the second motor.

7 Claims, 6 Drawing Sheets

(56) References Cited

U.S. PATENT DOCUMENTS

| | | | |
|---|---|---|---|
| 2003/0095822 A1* | 5/2003 | Kamimura | G03G 15/6564 399/396 |
| 2005/0082739 A1* | 4/2005 | Mitsuya | B65H 1/025 271/10.11 |
| 2007/0045933 A1* | 3/2007 | Okazaki | H04N 1/0057 271/104 |
| 2009/0001662 A1* | 1/2009 | Matsumoto | B65H 5/062 271/278 |
| 2012/0113488 A1 | 5/2012 | Machida et al. | |
| 2015/0301491 A1* | 10/2015 | Yoshikawa | B65H 5/062 271/3.16 |
| 2015/0360892 A1* | 12/2015 | Yoshimizu | B65H 5/068 271/3.16 |
| 2017/0082965 A1* | 3/2017 | Yamagishi | H02P 29/00 |

* cited by examiner

IMAGE READING APPARATUS HAVING FIRST MOTOR FOR ROTATING FEED ROLLER, AND SECOND MOTOR FOR ROTATING CONVEYANCE ROLLER AND REVERSE ROLLER

CROSS REFERENCE TO RELATED APPLICATION

This application claims priority from Japanese Patent Application No. 2015-160702 filed Aug. 17, 2015. The entire content of the priority application is incorporated herein by reference.

TECHNICAL FIELD

The present disclosure relates to an image reading apparatus.

BACKGROUND

A conventional image reading apparatus has an auto document feeder (ADF) function. The image reading apparatus conveys document sheets stacked on a tray using a feed roller, separates the document sheets one by one using a separation roller, and conveys the separated sheet to an image sensor using a conveyance roller. A sensor is disposed between the conveyance roller and the image sensor for detecting presence of a sheet. The feed roller and the conveyance roller are driven by a single motor, and a clutch is disposed between the motor and the feed roller so as to transmit/intercept a driving force from the motor.

A reading speed of the image reading apparatus varies depending on a desired image reading resolution. The image reading apparatus has three operation modes depending on the image reading resolution. A first operation mode corresponds to a high resolution reading. In the first operation mode, after the image reading apparatus ends an image reading of a preceding sheet, the feed roller starts feeding a subsequent sheet at a speed higher than a reading speed. Thereafter, when the sensor detects a leading edge of the subsequent sheet, the feed roller is stopped and the conveyance roller conveys the subsequent sheet to the image sensor at a low speed, which is the reading speed in this case. A second operation mode corresponds to a middle resolution reading. In the second operation mode, after the sensor detects a trailing edge of a preceding sheet, the feed roller starts feeding a subsequent sheet at a feed speed substantially equal to the reading speed. After the reading of an image of the preceding sheet ends, the feed roller increases the feed speed of the subsequent sheet to a higher speed. Thereafter, when the sensor detects the leading edge of the subsequent sheet, the conveyance roller conveys the subsequent sheet at a middle speed, which is the reading speed in this case, to the image sensor. A third operation mode corresponds to a low resolution reading. In the third mode, until a trailing edge of a preceding sheet passes through the position of the sensor, the feed roller does not feed a subsequent sheet. When the sensor detects the trailing edge of the preceding sheet, the feed roller starts feeding the subsequent sheet at the feed speed substantially equal to the reading speed. Thereafter, the feed speed of the subsequent speed by the feed roller is not changed. The conveyance roller conveys the subsequent sheet to the image sensor at a high speed which is the reading speed in this case when the leading edge of the subsequent sheet is detected by the sensor.

SUMMARY

In order to attain the above and other objects, the disclosure provides an image reading apparatus. The image reading apparatus includes a first motor, a second motor, a feed roller, a reverse roller, a conveyance roller, a reader, a detector, and a controller. The feed roller is configured to rotate in a rotational direction by torque generated by the first motor so as to convey a sheet to in a conveyance direction. The reverse roller is configured to be in peripheral contact with the feed roller, and configured to rotate in the rotational direction by torque received from the second motor via a torque limiter. The conveyance roller is disposed downstream of the feed roller in the conveyance direction, and configured to rotate in the rotational direction by torque from the second motor so as to convey the sheet from the feed roller in the conveyance direction. A circumferential speed of the conveyance roller varies depending on a circumferential speed of the reverse roller. The reader is disposed downstream of the conveyance roller in the conveyance direction and configured to read an image on the sheet at a reading position. The detector is disposed between the conveyance roller and the reading position in the conveyance direction and configured to detect the sheet. The controller comprising hardware configured to perform processes comprising: a first drive process in which the controller is configured to control the first motor and the second motor to rotate the feed roller with the circumferential speed of a first speed and the conveyance roller with the circumferential speed of a second speed, wherein the reverse roller is configured to be rotated with the circumferential speed of a third speed in the first drive process so that the reverse roller has a first separation performance for separating a sheet from other sheets, which are in an overlapped state, together with the feed roller with the circumferential speed of the first speed, wherein the feed roller conveys a specific sheet in the conveyance direction through the first drive process; a second drive process in which, in response to detection of a leading edge of the specific sheet by the detector after performing the first drive process, the controller is configured to stop the first motor, and to decelerate the second motor to rotate the conveyance roller with the circumferential speed of a fourth speed slower than both the first speed and the second speed, wherein when the circumferential speed of the conveyance roller is the fourth speed in the second drive process, the reverse roller is configured to be rotated with the circumferential speed of a fifth speed so that the reverse roller has a second separation performance for separating a sheet from other sheets which are in an overlapped state, wherein the fifth speed is slower than the third speed and the second separation performance is lower than the first separation performance, wherein the conveyance roller conveys the specific sheet through the second drive process; a third drive process in which, in response to conveying the specific sheet through the second drive process so that a trailing edge of the specific sheet reaches a first position after the detector detects the trailing edge of the specific sheet, the controller is configured to control the first motor to start rotating the feed roller with the circumferential speed of the first speed, wherein the first position is located between the detector and the reading position, and the first position is separated from the detector by a prescribed distance; and a fourth process in which, in response to passage of the trailing edge of the specific sheet through a reading end position after performing the third drive process, the controller is configured to accelerate the second motor to rotate the conveyance roller with the circumferential speed of the second speed while the circumferential speed of the feed roller is maintained to the first speed, the reading end position being downstream of the first position in the conveyance direction.

According to another aspects, the disclosure provides a method. The method includes: a first drive step to control a first motor and a second motor of an image reading apparatus to rotate a feed roller with the circumferential speed of a first speed and a conveyance roller with the circumferential speed of a second speed, wherein the reverse roller is configured to be rotated with the circumferential speed of a third speed in the first drive step so that the reverse roller has a first separation performance for separating a sheet from other sheets, which are in an overlapped state, together with the feed roller with the circumferential speed of the first speed, wherein the feed roller conveys the specific sheet in a conveyance direction through the first drive step, wherein the image reading apparatus includes: the first motor; the second motor; the feed roller configured to rotate in a rotational direction by torque generated by the first motor so as to convey a sheet to in the conveyance direction; the reverse roller in peripheral contact with the feed roller, and configured to rotate in the rotational direction by torque received from the second motor via a torque limiter; the conveyance roller disposed downstream of the feed roller in the conveyance direction, and configured to rotate in the rotational direction by torque from the second motor so as to convey the sheet from the feed roller in the conveyance direction, the circumferential speed of the conveyance roller varying depending on the circumferential speed of the reverse roller; a reader disposed downstream of the conveyance roller in the conveyance direction and configured to read an image on the sheet at a reading position; and a detector disposed between the conveyance roller and the reading position in the conveyance direction and configured to detect the sheet; a second drive step, in response to detection of a leading edge of the specific sheet by the detector after performing the first drive step, to stop the first motor, and to decelerate the second motor to rotate the conveyance roller with the circumferential speed of a fourth speed slower than both the first speed and the second speed, wherein when the circumferential speed of the conveyance roller is the fourth speed in the second drive step, the reverse roller is configured to be rotated with the circumferential speed of a fifth speed so that the reverse roller has a second separation performance for separating a sheet from other sheets which are in an overlapped state, wherein the fifth speed is slower than the third speed and the second separation performance is lower than the first separation performance, wherein the conveyance roller conveys the specific sheet through the second drive step; a third drive step, in response to conveying the specific sheet through the second drive step so that a trailing edge of the specific sheet reaches a first position after the detector detects the trailing edge of the specific sheet, to control the first motor to start rotating the feed roller with that the circumferential speed of the first speed, wherein the first position is located between the detector and the reading position, and the first position is separated from the detector by a prescribed distance; and a fourth step, in response to passage of the trailing edge of the specific sheet through a reading end position after performing the third drive step, to accelerate the second motor to rotate the conveyance roller with the circumferential speed of the second speed while the circumferential speed of the feed roller is maintained to the first speed, the reading end position being downstream of the first position in the conveyance direction.

BRIEF DESCRIPTION OF THE DRAWINGS

The particular features and advantages of the disclosure as well as other objects will become apparent from the following description taken in connection with the accompanying drawings, in which.

DETAILED DESCRIPTION

In order to ensure sheet separation performance using a separation roller, a ratio of the circumferential speed of the separation roller to that of a feed roller needs to be equal to or greater than a prescribed ratio. When the circumferential speed of the feed roller is less than a prescribed speed, a sheet feeding force of the feed roller decreases and unloaded feed, in which the feed roller is idly rotated, is likely to occur. Accordingly, when sheets are fed by the feed roller and the sheets are separated by the separation roller, it is necessary to control the circumferential speeds of the separation roller and the feed roller to be within prescribed ranges. In the conventional second operation mode, after the trailing edge of the preceding sheet is detected by the sensor, the subsequent sheet is fed at the speed equal to the reading speed (middle speed). In this case, there is a possibility of the unloaded feed of a sheet occurring due to the insufficient feed speed. On the other hand, in the first operation mode, the subsequent sheet is not fed until the image reading of the preceding sheet ends. Accordingly, start of the image reading of the subsequent sheet is delayed and the time required for reading a plurality of sheets as a whole is extended. Accordingly, a problem that image reading efficiency decreases is occurred.

It is conceivable to provide a motor for driving the feed roller separately from a motor for driving the separation roller and the conveyance roller so as to set the feed speed of a subsequent sheet to be high in the second operation mode and thus prevent the unloaded feed of a sheet. When the separation roller and the conveyance roller are driven by the same motor, the circumferential speed of the separation roller is limited by the circumferential speed of the conveyance roller which sets the reading speed. When the reading speed is relatively low, there is a problem that the ratio of the circumferential speed of the separation roller to that of the feed roller is not equal to or greater than a prescribed ratio and there is a possibility that sheet separation performance of the separation roller decreases.

An embodiment of the present disclosure provides an image reading apparatus that can ensure sheet separation performance and image reading efficiency.

Figure 1:
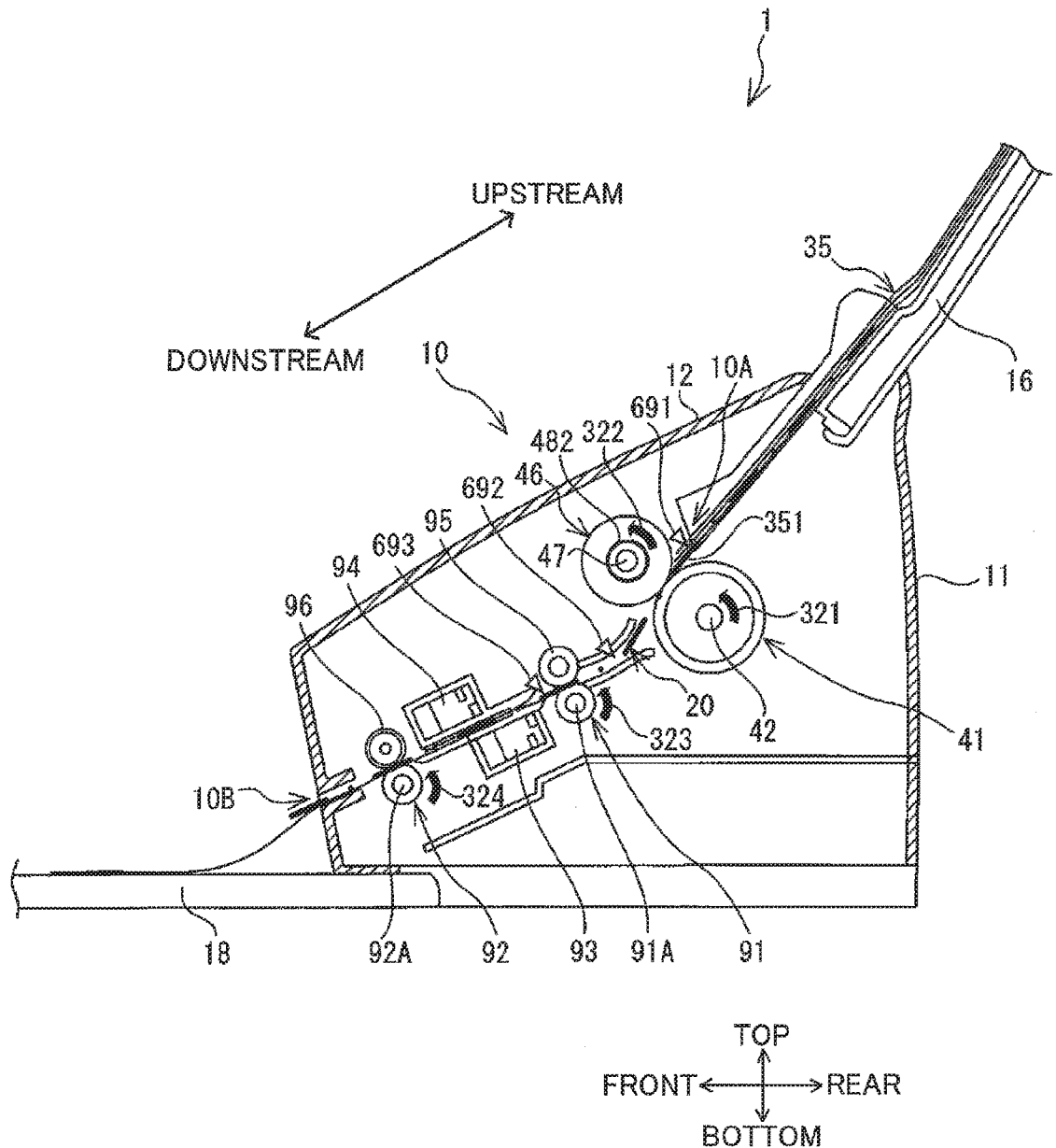
FIG. 1 is a cross section of an image reading apparatus illustrating an entire configuration thereof according to an embodiment.

An image reading apparatus 1 according to an embodiment will be explained while referring to drawings. As shown in FIG. 1, the image reading apparatus 1 includes a housing 10, a sheet feed tray 16, and a sheet discharge tray 18. The terms "upward", "downward", "upper", "lower", "above", "below", "beneath", "right", "left", "front", "rear"

and the like will be used throughout the description assuming that the image reading apparatus 1 is disposed in an orientation in which it is intended to be used. In use, the image reading apparatus 1 is disposed as shown in FIG. 1. Here, near side and far side of FIG. 1 respectively indicate the right side and the left side of the image reading apparatus 1.

The housing 10 includes a first housing 11 and a second housing 12. The first housing 11 and the second housing 12 have a substantially box shape. The first housing 11 constitutes a lower part of the housing 10. The second housing 12 is placed on the first housing 11 from above. A conveyance path 20 is formed between the first housing 11 and the second housing 12 in the upper-lower direction. A plurality of sheets 35 is conveyed through the conveyance path 20. The conveyance path 20 corresponds to a region through which a sheet 35 passes when the image reading apparatus 1 receives the sheet 35 and reads an image thereof. The conveyance path 20 communicates with the outside of the housing 10 by a sheet inlet 10A and a sheet outlet 10B. The conveyance path 20 is defined between the top surface of the first housing 11 and the bottom surface of the second housing 12.

The sheet feed tray 16 extends from the rear side of the sheet inlet 10A in the first housing 11 to a rear upper side. The sheet feed tray 16 has a substantially plate shape. The plurality of sheets 35, such as, thin paper or thick paper with A4 size, and a letter size, is placed on the top surface of the sheet feed tray 16.

The sheet discharge tray 18 extends from the bottom side of the sheet outlet 10B in the first housing 11 to the front side. The sheet discharge tray 18 has a substantially plate shape. The top surface of the sheet discharge tray 18 receives the sheets 35 discharged from the sheet outlet 10B to the outside of the housing 10.

The first housing 11 is provided with a feed roller 41, a conveyance roller 91, and a conveyance roller 92. The feed roller 41, the conveyance roller 91, and the conveyance roller 92 are arranged in this order from a rear upper side to an front lower side along the conveyance path 20.

The feed roller 41 has a cylindrical shape. A rotation shaft of the feed roller 41 is parallel to the right-left direction. A shaft member 42 extends along a rotation axis of the feed roller 41. The shaft member 42 is rotatably supported by the first housing 11. The shaft member 42 rotates according to rotation of a first motor 71 (see FIG. 2) described later. As shown in an arrow 321, the feed roller 41 rotates counterclockwise according to the rotation of the shaft member 42 in a right side view. A part of the feed roller 41 (for example, an outer circumferential portion located on the upper side of the feed roller 41) protrudes toward the conveyance path 20. A one-way clutch (not shown) is disposed between the feed roller 41 and the shaft member 42. The one-way clutch allows the feed roller 41 to idly rotate counterclockwise in a right side view with respect to the shaft member 42.

The conveyance rollers 91 and 92 have a cylindrical shape. Rotation shafts of the conveyance rollers 91 and 92 are parallel to the right-left direction. The conveyance rollers 91 and 92 have the same shape. A shaft member 91A extends along a rotation axis of the conveyance roller 91. A shaft member 92A extends along a rotation axis of the conveyance roller 92. The shaft members 91A and 92A are rotatably supported by the first housing 11. The shaft members 91A and 92A rotate with rotation of a second motor 72 (see FIG. 2) described later. The conveyance roller 91 rotates counterclockwise according to the rotation of the shaft member 91A (arrow 323). The conveyance roller 92 rotates counterclockwise according to the rotation of the shaft member 92A (arrow 324). Parts of the conveyance rollers 91 and 92 (for example, outer circumferential portions located on the upper sides thereof) protrude toward the conveyance path 20.

The conveyance direction corresponds to a direction from the rear-upper side to the front lower side. Here, the conveyance direction is a direction in which the conveyance path 20 extends and thus corresponds to a shape of the top surface of the first housing 11 and a shape of the bottom surface of the second housing 12, and may not be defined as a straight direction. The directional relationship of the conveyance direction with respect to the front-rear direction, the upper-lower direction, and the right-left direction may vary depending on a position in the conveyance path 20. The sheet inlet 10A side in the conveyance path 20 is referred to as "upstream" in the conveyance direction. The sheet outlet 10B side in the conveyance path 20 is referred to as "downstream" in the conveyance direction.

The first housing 11 includes a first reader 93. The second housing 12 includes a second reader 94. The first reader 93 and the second reader 94 are known contact type image sensor modules. The first reader 93 and the second reader 94 are electrically connected to a controller 50 (see FIG. 2) described later. The first reader 93 is disposed between the conveyance rollers 91 and 92 in the conveyance direction at lower side of the conveyance path 20. The second reader 94 is disposed between the conveyance rollers 91 and 92 in the conveyance direction at upper side of the conveyance path 20. The first reader 93 and the second reader 94 employ the right-left direction as a main scanning direction. The first reader 93 includes a contact image sensor (CIS) 21A (see FIG. 2) that linearly extends in the right-left direction. The second reader 94 includes a CIS 21B (see FIG. 2) that linearly extends in the right-left direction. The main scanning directions of the CISs 21A and 21B are parallel to the right-left direction. The first reader 93 reads an image of a bottom surface of a sheet 35 which is conveyed from upstream to downstream along the conveyance path 20 and reaches a first reading position R1 (see FIG. 5). The first reading position R1 is a position in the conveyance path 20 corresponding to a position at which the image of the sheet 35 is read by the CIS 21A (a position on an object plane that is focused on a light-receiving element of the CIS 21A). The second reader 94 reads an image of a top surface of a sheet 35 which is conveyed from upstream to downstream along the conveyance path 20 and reaches a second reading position R2 (see FIG. 5). The second reading position R2 is a position in the conveyance path 20 corresponding to a position at which the image of the sheet 35 is read by the CIS 21B in the second reader 94 (a position on an object plane that is focused on a light-receiving element of the CIS 21B). The first reader 93 and the second reader 94 output respective data of the read images to the controller 50.

The second housing 12 includes a reverse roller 46, follower rollers 95 and 96, a front sensor 691, a rear A sensor 692, and a rear B sensor 693. The reverse roller 46 is disposed above the feed roller 41. The reverse roller 46 has a cylindrical shape. The diameter of the reverse roller 46 is smaller than the diameter of the feed roller 41. The rotation shaft of the reverse roller 46 is parallel to the right-left direction. A shaft member 47 thereof extends along a rotation axis of the reverse roller 46. The shaft member 47 is rotatably supported by the second housing 12. Apart of the reverse roller 46 (for example, an outer circumferential portion located on the lower side thereof) protrudes toward the conveyance path 20. An end of the reverse roller 46 close to the feed roller 41 is into contact with the feed roller 41 in the conveyance path 20. The reverse roller 46 is disposed at upper side of the conveyance path 20. The shaft member 47 rotates according to rotation of a second motor 72 (see FIG. 2) described later. The reverse roller 46 is connected to the shaft member 47 via a torque limiter 482. A rotational force (torque) of the second motor 72 transmitted to the shaft member 47 is transmitted to the reverse roller 46 via the torque limiter 482.

The feed roller 41 rotates counterclockwise while being in contact with the reverse roller 46 (arrow 321). According to this rotation, a torque acts on the reverse roller 46. The torque limiter 482 is disposed between the shaft member 47 and the reverse roller 46 and connects the shaft member 47 and the reverse roller 46 in a state in which a torque less than a prescribed threshold value acts on the reverse roller 46. Accordingly, when a torque less than the prescribed threshold value acts on the reverse roller 46, the reverse roller 46 rotates counterclockwise with the rotational force transmitted from the shaft member 47 (arrow 322). The torque limiter 482 disconnects the shaft member 47 and the reverse roller 46 from each other in a state in which the torque equal to or greater than a prescribed threshold value acts on the reverse roller 46. Accordingly, when a torque equal to or greater than the prescribed threshold value acts on the reverse roller 46, the reverse roller 46 and the shaft member 47 are disconnected from each other and the rotational force of the second motor 72 is not transmitted to the reverse roller 46.

The prescribed threshold value is set to a value with which the shaft member 47 and the reverse roller 46 are disconnected from each other due to friction between the sheet 35 and the reverse roller 46 and friction between the feed roller 41 and the reverse roller 46. The prescribed threshold value is set to a value with which the shaft member 47 and the reverse roller 46 are not disconnected from each other due to frictions generated between the sheets 35 that are interposed between the feed roller 41 and the reverse roller 46. Accordingly, when two or more sheets 35 are present between the feed roller 41 and the reverse roller 46, the reverse roller 46 rotates counterclockwise according to the rotational force transmitted from the shaft member 47. When no sheet 35 is present between the feed roller 41 and the reverse roller 46 or when only one sheet is present therebetween, the reverse roller 46 does not receive the rotational force from the shaft member 47.

The follower rollers 95 and 96 have a cylindrical shape. The follower roller 95 is in contact with the upper side of the conveyance roller 91. The follower roller 96 is in contact with the upper side of the conveyance roller 92. Rotation shafts of the follower rollers 95 and 96 are parallel to the right-left direction. The follower rollers 95 and 96 have the same shape. Shaft members to which the follower rollers 95 and 96 are fixed are rotatably supported by the second housing 12. The shaft members 91A and 92A rotate with the rotation of the second motor 72 (see FIG. 2) described later. The follower roller 95 is urged to the conveyance roller 91 by a spring (not shown). The follower roller 96 is urged to the conveyance roller 92 by a spring (not shown). Parts (for example, outer circumferential portions located on the lower sides of the follower rollers 95 and 96) of the follower rollers 95 and 96 protrude toward the conveyance path 20.

Each of the front sensor 691, the rear A sensor 692, and the rear B sensor 693 is a sensor that can detect a sheet 35. Each of the front sensor 691, the rear A sensor 692, and the rear B sensor 693 includes a rotating member that rotates when a sheet 35 comes in contact with the rotating member, and a known optical sensor that can detect rotation of the rotating member. The front sensor 691, the rear A sensor 692, and the rear B sensor 693 are electrically connected to the controller 50 (see FIG. 2) described later. Each of the front sensor 691, the rear A sensor 692, and the rear B sensor 693 includes a light-emitting element (not shown) and a light-receiving element (not shown), detects whether light emitted from the light-emitting element is received by the light-receiving element, and outputs a signal indicating the detection result to the controller 50. For example, when a sheet 35 does not come in contact with the rotating member, the rotating member blocks light emitted from the light-emitting element and the light-receiving element does not detect light. When a sheet 35 comes in contact with the rotating member, light emitted from the light-emitting element is not blocked due to the rotation of the rotating member and the light-receiving element detects the light. Some of the front sensor 691, the rear A sensor 692, and the rear B sensor 693 may detect whether a sheet 35 blocks light by configuring the light-emitting element and the light-receiving element to face each other with the conveyance path 20 interposed therebetween. In this case, the rotating member is not necessary.

The front sensor 691 is disposed between the sheet inlet 10A and the feed roller 41 in the conveyance direction on the upper side of the conveyance path 20. The front sensor 691 is disposed upstream of the feed roller 41 in the conveyance path 20 and in the vicinity of the sheet inlet 10A on the front-lower side of the sheet feed tray 16. The front sensor 691 detects presence of a sheet 35 placed on the sheet feed tray 16 at the position where the front sensor 691 is disposed.

The rear A sensor 692 is disposed between the feed roller 41 and the conveyance roller 91 in the conveyance direction on the upper side of the conveyance path 20. The rear A sensor 692 is disposed downstream of the feed roller 41 and upstream of the conveyance roller 91 in the middle way of the conveyance path 20. The rear A sensor 692 detects presence of a sheet 35 which is conveyed from the feed roller 41 to the conveyance roller 91 along the conveyance path 20 at the position where the rear A sensor 692 is disposed.

The rear B sensor 693 is disposed between the conveyance roller 91 and the first reader 93 and between the conveyance roller 91 and the second reader 94 in the conveyance direction on the upper side of the conveyance path 20. The rear B sensor 693 is disposed downstream of the conveyance roller 91 and upstream of the first reading position R1 and the second reading position R2 (see FIG. 5) in the middle way of the conveyance path 20. The rear B sensor 693 detects presence of a sheet 35 which is conveyed from the conveyance roller 91 to the first reader 93 and the second reader 94 along the conveyance path 20 at the position where the rear B sensor 693 is disposed.

Figure 2:
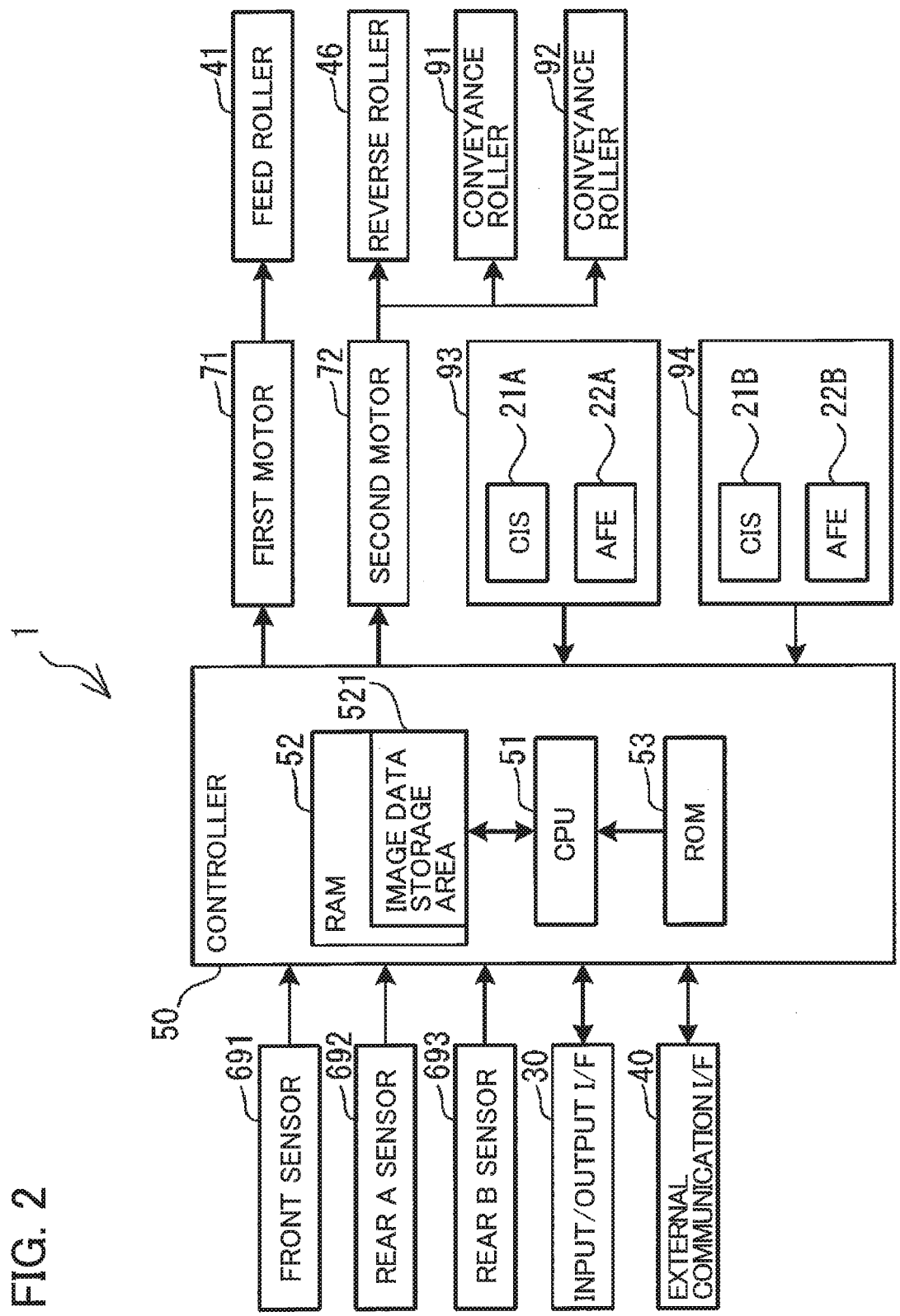
FIG. 2 is a block diagram illustrating an electrical configuration of the image reading apparatus according to the embodiment.

FIG. 2 is a block diagram illustrating an electrical configuration of the image reading apparatus 1. The image reading apparatus 1 includes an input/output interface (I/F) 30, an external communication interface (I/F) 40, and a controller 50.

The input/output I/F 30 is an interface element conforming to a prescribed standard (for example, universal serial bus (USB)) and is an interface for connecting a removable medium such as a USB memory to the image reading apparatus 1. In the embodiment, the input/output I/F 30 is a USB port.

The external communication I/F 40 includes a circuit for communication between the image reading apparatus and an external device such as a personal computer (PC) via a LAN. The external communication I/F 40 may be an interface (for example, USB interface) for directly communicating with an external device without using a LAN.

The controller 50 includes a central processing unit (CPU) 51 that controls the entire image reading apparatus 1. The controller 50 includes a prescribed electrical circuit for transmitting a drive signal (for example, a drive current) to the first motor 71 and the second motor 72 in accordance with an instruction from the CPU 51. The CPU 51 is electrically connected to a RAM 52 and a ROM 53. The RAM 52 temporarily stores various data such as calculation results acquired from calculation processes by the CPU 51. The RAM 52 includes at least a storage area such as an image data storage area 521 configured to tore image data of an image of a sheet 35.

The ROM 53 stores an operating system (OS). The ROM 53 stores a program that causes the CPU 51 to perform a main process (see FIGS. 3 and 4) described later and initial values of flags or data which are used in various programs. The ROM 53 is an example of a non-transitory storage medium. The non-transitory storage medium may be a storage medium that can store information regardless of a period. The non-transitory storage medium may not include a temporary storage medium (for example, signals to be transmitted). A storage in the embodiment is the ROM 53, but the storage may include another non-transitory storage medium such as a flash memory or a RAM that can store data regardless of the length of time.

The controller 50 is electrically connected to the first motor 71, the second motor 72, the first reader 93, the second reader 94, the front sensor 691, the rear A sensor 692, and the rear B sensor 693. The first motor 71 rotates the feed roller 41 via the shaft member 42 (see FIG. 1). The second motor 72 rotates the reverse roller 46, the conveyance rollers 91 and 92 via the shaft members 47, 91A, and 92A, respectively. Various types of motors can be employed for the first motor 71 and the second motor 72. In the embodiment, the first motor 71 and the second motor 72 are both stepping motors. A drive signal of a stepping motor is generally a pulse signal of a prescribed frequency. The CPU 51 generates driving signals for driving the first motor 71 and the second motor 72 on a step-to-step, and thus the controller 50 drives the first motor 71 and the second motor 72. The changes of rotation speeds of the first motor 71 and the second motor 72 are performed, for example, by switching the frequency of the drive pulse.

The first reader 93 includes the CIS 21A and an analog front end (AFE) 22A. The second reader 94 includes the CIS 21B and an AFE 22B. The CISs 21A and 21B read images of a sheet 35. The AFEs 22A and 22B convert the analog images read by the respective CISs 21A and 21B into digital image data. The image data is stored in the image data storage area 521 of the RAM 52 on a line-to-line basis. Here, each line indicates each pixel line which is arranged in a main scanning direction (corresponding to a "sheet width direction") of the first reader 93 and the second reader 94. The image data stored in the image data storage area 521 is read by the CPU 51 and is subjected to image processes such as gamma correction, enlargement, or reduction. The image-processed image data is subjected to data processes such as compression or encoding by the CPU 51 and is then stored in the image data storage area 521 again. The data-processed image data stored in the image data storage area 521 is sequentially transmitted to an external apparatus via the input/output I/F 30 or the external communication I/F 40 on a line-to-line basis in accordance with a transmission instruction from an external apparatus such as a PC.

The front sensor 691 outputs an ON signal to the controller 50 when the front sensor detects a sheet 35 placed on the sheet feed tray 16, and outputs an OFF signal to the controller 50 when the front sensor does not detect a sheet 35. The rear A sensor 692 outputs an ON signal to the controller 50 when the rear A sensor detects a sheet 35 at the position at which the rear A sensor 692 is disposed, and outputs an OFF signal to the controller 50 when the rear A sensor 692 does not detect a sheet 35 at the position at which the rear A sensor 692 is disposed. The rear B sensor 693 outputs an ON signal to the controller 50 when the rear B sensor detects a sheet 35 at the position at which the rear B sensor 693 is disposed, and outputs an OFF signal to the controller 50 when the rear B sensor 693 does not detect a sheet 35 at the position at which the rear B sensor 693 is disposed.

Operations when the plurality of sheets 35 is conveyed and images of the sheets 35 are read by the image reading apparatus 1 will be described below with reference to FIGS. 1 and 5. When the plurality of sheets 35 is placed on the top surface of the sheet feed tray 16 by a user, the front sensor 691 detects the sheets 35 and transmits a detection signal to the controller 50. Accordingly, the controller 50 detects that the sheets 35 are placed on the sheet feed tray 16.

The controller 50 rotates the first motor 71. The rotational force of the first motor 71 is transmitted to the shaft member 42 so as to rotate the feed roller 41 counterclockwise (arrow 321). The controller 50 rotates the second motor 72. The rotational force of the second motor 72 is transmitted to the shaft members 91A and 92A so as to rotate the conveyance rollers 91 and 92 counterclockwise (arrows 323 and 324). Until sheets 35 reaches a nip point between the feed roller 41 and the reverse roller 46, a torque acting on the reverse roller 46 due to the friction between the feed roller 41 and the reverse roller 46 is equal to or greater than a prescribed threshold value. Accordingly, the torque limiter 482 interrupts transmission of the rotational force between the reverse roller 46 and the shaft member 47. Thus, the reverse roller 46 rotates clockwise to follow the counterclockwise rotation of the feed roller 41. When sheets 35 reaches the nip point between the feed roller 41 and the reverse roller 46, a torque due to the friction between the sheets 35 acts on the reverse roller 46. Since this torque is less than the prescribed threshold value, the rotational force of the second motor 72 is transmitted to the reverse roller 46, and thus the reverse roller 46 rotate counterclockwise (arrow 322). The circumferential speed of the reverse roller 46 depends on the rotational speed of the second motor 72. The circumferential speed of the conveyance rollers 91 and 92 also depends on the rotational speed of the second motor 72. In other words, the circumferential speed of the conveyance rollers 91 and 92 varies depending on (or is related to) a circumferential speed of the reverse roller 46.

In this state, the feed roller 41 comes, from the bottom side, in contact with a lowermost sheet 351 among the sheets 35 which moves downstream in the conveyance direction along the conveyance path 20. According to the counterclockwise rotation of the feed roller 41, the sheets 35 move downstream along the conveyance path 20. The downstream edges of the sheets 35 are located at the nip point between the feed roller 41 and the reverse roller 46. At this time, the reverse roller 46 and the feed roller 41 interpose a sheet 351 and upper sheets 35 on the sheet 351 at the nip point. By counterclockwise rotation of the reverse roller 46, the sheet 351 is separated from the upper sheets 35 on the sheet 351. When the feed roller 41 continues to rotate counterclockwise, the sheet 351 moves downstream from the nip point.

Figure 8:
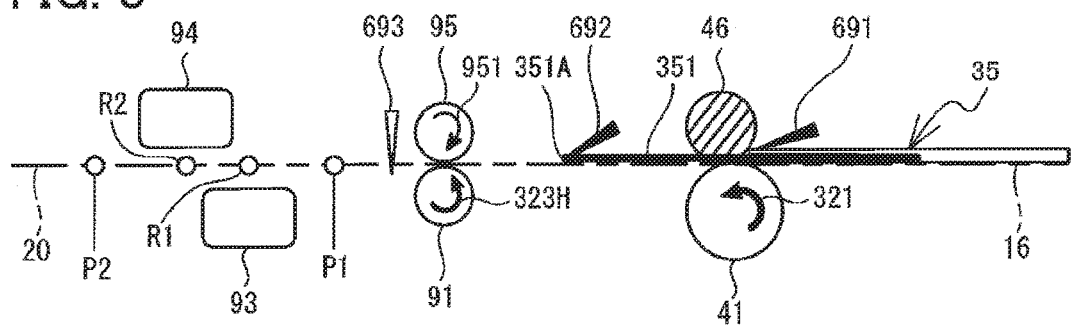

The upper sheets 35 on the sheet 351 remain upstream from the nip point. According to the rotation of the feed roller 41 and the reverse roller 46, the sheet 351 is separated from the remaining sheets 35. The sheet 351 separated from the remaining sheets 35 moves downstream along the conveyance path 20. The rear A sensor 692 detects the sheet 35 (351) moving downstream along the conveyance path 20 from the nip point between the feed roller 41 and the reverse roller 46 and transmits a detection signal to the controller 50 (FIG. 8). The controller 50 detects that the sheet 35 is present at the position at which the rear A sensor 692 is disposed.

In order to certainly separate one sheet 351 from the upper sheets 35 on the sheet 351 by the rotation of the feed roller 41 and the reverse roller 46, it is necessary to set a ratio of the circumferential speed of the reverse roller 46 to the circumferential speed of the feed roller 41 to be higher than a prescribed ratio. When the circumferential speed of the feed roller 41 is lower than a prescribed circumferential speed, a conveying force for the sheet 35 by the rotation of the feed roller 41 is insufficient and unloaded feed of the sheet 35 is likely to occur. Accordingly, in order to satisfactorily move the sheet 35 by the rotation of the feed roller 41, the circumferential speed of the feed roller 41 needs to be equal to or higher than a prescribed circumferential speed. When the first motor 71 is driven, the image reading apparatus 1 prevents unloaded feed of a sheet 35 by setting the rotation speed of the first motor 71 to a rotation speed at which the feed roller 41 rotates at a circumferential speed Ha. When the feed roller rotates at the circumferential speed Ha, unloaded feed of the sheet 35 is not likely to occur.

Figure 9:
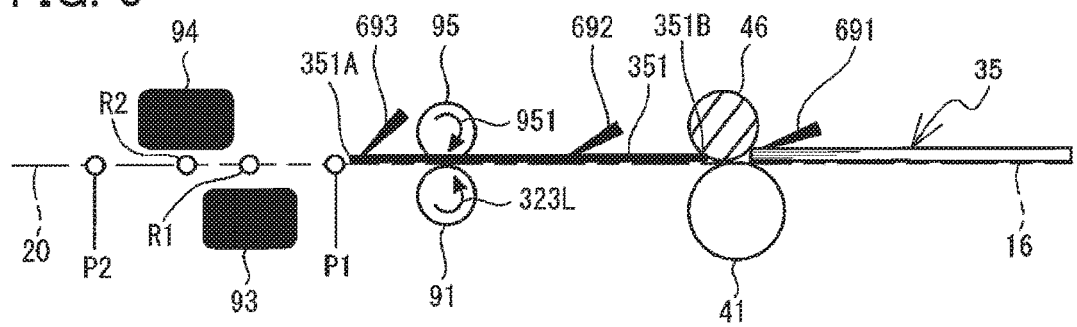

The sheet 35 is conveyed to downstream of the rear A sensor 692 along the conveyance path 20. The conveyance roller 91 comes in contact with the sheet 35 from the bottom side while the sheet 35 moves along the conveyance path 20. The conveyance roller 91 conveys the sheet 35 further downstream while the follower roller 95 and the conveyance roller 91 interpose the sheet therebetween. The rear B sensor 693 detects the sheet 35 and transmits a detection signal to the controller 50 (FIG. 9). The controller 50 detects that the sheet 35 is present at the position at which the rear B sensor 693 is disposed.

Figure 10:
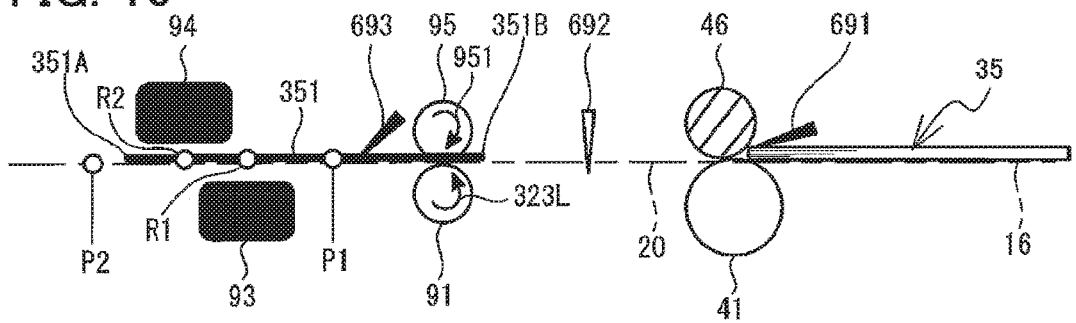

The sheet 35 is conveyed to downstream of the rear B sensor 693 along the conveyance path 20. The conveyance roller 91 comes in contact with the sheet 35 from the bottom side while the sheet 35 moves along the conveyance path 20. The conveyance roller 91 conveys the sheet 35 further downstream (FIG. 10). The first reader 93 disposed at downstream of the conveyance roller 91 reads an image of the bottom surface of the sheet 35. The second reader 94 disposed at downstream of the conveyance roller 91 reads an image of the top surface of the sheet 35. Output signals of the first reader 93 and the second reader 94 are transmitted to the controller 50 and are converted into data.

In the image reading apparatus 1, a conveying speed in the conveyance direction (that is, a sub scanning direction) of the sheet 35 is set depending on a reading resolution in the main scanning direction. When image reading cycles of the first reader 93 and the second reader 94 are constant, the number of read lines, which is the number of times per unit length at which each of the first reader 93 and the second reader 94 reads the images of the sheet 35 for each line, is inverse proportional to the conveying speed. Since the number of read lines of the image data decreases as the conveying speed of the sheet 35 by the conveyance rollers 91 and 92 becomes higher at an image reading time, the image reading apparatus 1 decreases the reading resolution in the sub scanning direction of the image data. Since the number of read lines of the image data increases as the conveying speed of the sheet 35 by the conveyance rollers 91 and 92 becomes lower at an image reading time, the image reading apparatus 1 increases the reading resolution in the sub scanning direction of the image data. The conveying speed of the sheet 35 by the conveyance rollers 91 and 92 when the images of the sheet 35 is read by the first reader 93 and the second reader 94 is adjusted depending on specifications such as the reading resolution required for the image reading result, the process speed of image data by the first reader 93 and the second reader 94.

The conveying speed of the sheet 35 with respect to the first reader 93 and the second reader 94 at the image reading time (that is, the conveying speed of the sheet 35 when the first reader 93 or the second reader 94 reads the sheet 35) is defined by the circumferential speeds of the conveyance rollers 91 and 92. In the embodiment, the controller 50 controls the second motor 72 so that the conveyance rollers 91 and 92 at the time of reading the sheet 35 rotate at a circumferential speed Lb. The image reading time is a time period between an image reading start and an image reading end. The image reading start indicates a timing when starting storage of image data in the image data storage area 521 of the RAM 52 on a line-to-line basis in response to transmission of an image reading start instruction to the CIS 21A of the first reader 93 and the CIS 21B of the second reader 94 from the controller 50. A process for the image reading start by the controller 50 is triggered by switch of the rear B sensor 693 from "OFF" to "ON" when the leading edge of the sheet 35 conveyed along the conveyance path 20 by the feed roller 41 passes through the position at which the rear B sensor 693 is disposed. Accordingly, the sheet 35 at the first reading position R1 is read by the reader 92 and/or the sheet at the second reading position R2 is read by the reader 93.

Image reading end indicates a timing when storing image data in the image data storage area 521 of the RAM 52 on a line-to-line basis is ended in response to transmission of an image reading end instruction to the CIS 21A of the first reader 93 and the CIS 21B of the second reader 94 from the controller 50. A process for the image reading end by the controller 50 is triggered when the trailing edge of the sheet 35 conveyed along the conveyance path 20 by the conveyance roller 92 passes through a reading end position P2 (see FIG. 12). Accordingly, the first reader 93 and the second reader 94 end reading images of the sheet 35.

Figure 5:
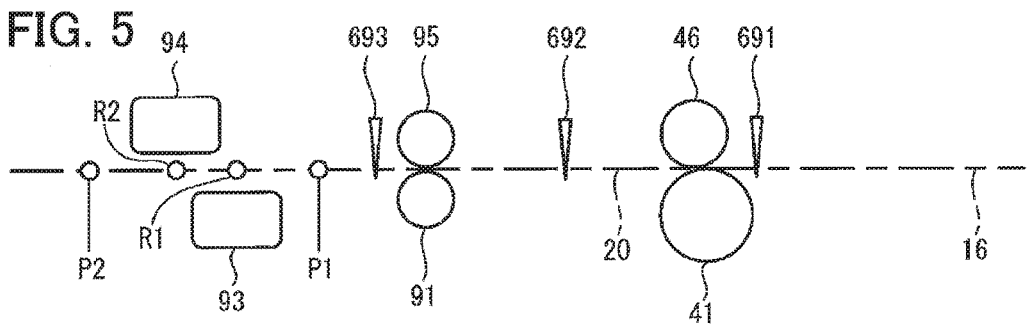
FIGS. 5-12 are explanatory diagrams illustrating operations of the image reading apparatus.

As shown in FIG. 5, the first reading position R1 is disposed at upstream of the second reading position R2 in the conveyance direction in the conveyance path 20. The reading end position P2 is located at downstream of a first position P1 (described later) in the conveyance direction. The reading end position P2 is disposed at a prescribed position downstream of the second reading position R2 in the conveyance path 20. In the image reading apparatus 1, when the sheet 35 skewed relative to the conveyance direction is conveyed and passes through the first reading position R1 and the second reading position R2, the image of the sheet 35 may be read obliquely. In order to cope with this oblique read, overscan may be performed for the purpose of correcting the acquired image data. Here, the overscan indicates that an image is read in a broader range than the final reading result. The reading end position P2 is set downstream of the first reading position R1 and the second reading position R2 considering conveyance amount of the sheet 35 required for the overscan. The reading end position P2 may be changed by a user's setting. In this case, the reading end position P2 may be disposed upstream of the first reading position R1 and the second reading position R2 provided that the reading end position P2 is downstream of the first position P1.

In the embodiment, the controller 50 controls the second motor 72 so that the circumferential speed Hb of the conveyance rollers 91 and 92 at a time other than the image reading time is higher than the circumferential speed Lb of the conveyance rollers 91 and 92 at the image reading time. At a time other than the image reading time, the conveying speed of each sheet 35 does not need to be set depending on the reading resolution. The circumferential speed of the conveyance rollers 91 and 92 is set to the circumferential speed Hb. In other words, the conveying speed of the sheet 35 in the conveyance path 20 is increased at a time other than the image reading time. Accordingly, the image reading apparatus 1 reduces a gap between the sheets 35 in the conveyance path 20 and shorten a time required for reading images of the whole sheets 35.

The rear B sensor 693 is switched from "OFF" to "ON" in response to passing the leading edge of the sheet 35 through the position at which the rear B sensor 693 is disposed. The switch of the rear B sensor 693 from "OFF" to "ON" is a trigger for a process for stopping the first motor 71 by the controller 50. Accordingly, the feed roller 41 is stopped. Thereafter, the image reading is started. At image reading time, the sheet 35 is sequentially conveyed downstream in the conveyance direction by the conveyance rollers 91 and 92. When the trailing edge of the sheet 35 is conveyed to the first position P1, the controller 50 conveys a sheet 35 subject to next read to the conveyance roller 91 by controlling the second motor 72 so that the feed roller 41 rotates at the circumferential speed Ha. The first position P1 is a position between the rear B sensor 693 and the first reading position R1 in the conveyance path 20. In the embodiment, provided that the feed roller 41 rotates, the circumferential speed of the feed roller 41 is Ha at any one of the image reading time and the time other than the image reading time. Accordingly, occurrence of unloaded feed of the sheet 35 due to insufficient rotation of the feed roller 41 is reduced. In the embodiment, the circumferential speed Ha of the feed roller 41 and the circumferential speeds Hb and Lb of the conveyance rollers 91 and 92 have the following relationship: Lb<Ha≤Hb.

The conveyance roller 92 comes in contact with the sheet 35 from the bottom side when the sheet 35 passes through the first reading position R1 and the second reading position R2. The conveyance roller 92 further conveys the sheet 35 downstream while the follower roller 96 and the conveyance roller 92 interpose the sheet 35 therebetween. The sheet 35 is discharged from the sheet outlet 10B to the outside of the housing 10 and is placed on the sheet discharge tray 18.

The main process of the image reading apparatus 1 according to the embodiment will be described below with reference to FIGS. 3 to 12. In FIGS. 5 to 12, the conveyance path 20 is depicted to extend horizontally for simplifying explanation with respect to conveyance of the sheet 35 in the conveyance path 20. In FIGS. 5 to 12, the shaft members 42, 47, and 91A and the conveyance roller 92 are omitted.

As shown in FIG. 5, when no sheet is placed on the sheet feed tray 16 and an image reading start instruction for the sheets 35 is not input via an operation unit (not shown) of the image reading apparatus 1, the image reading apparatus 1 is maintained in a standby state. In the image reading apparatus 1 in the standby state, since the first motor 71 and the second motor 72 are not driven, the feed roller 41, the reverse roller 46, and the conveyance rollers 91 and 92 do not rotate. The front sensor 691, the rear A sensor 692, and the rear B sensor 693 output the OFF signals to the controller 50.

Figure 6:
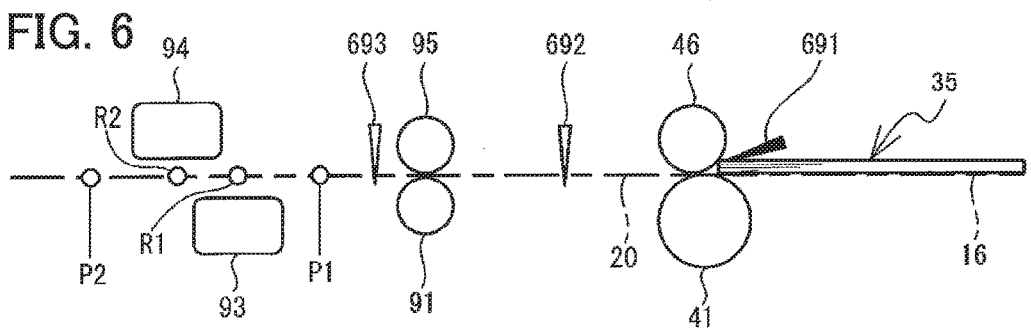

As shown in FIG. 6, when a plurality of sheets 35 is placed on the sheet feed tray 16, the front sensor 691 detects at least one of the sheets 35 placed on the sheet feed tray 16 and outputs the ON signal to the controller 50. In FIG. 6, the front sensor 691 is illustrated in black, which schematically represents that the front sensor 691 outputs the ON signal to the controller 50. In this state, when a user operates the operation unit (not shown) of the image reading apparatus 1 to input the image reading start instruction for the sheets 35, the CPU 51 starts the main process by executing the program stored in the ROM 53.

Figure 3:
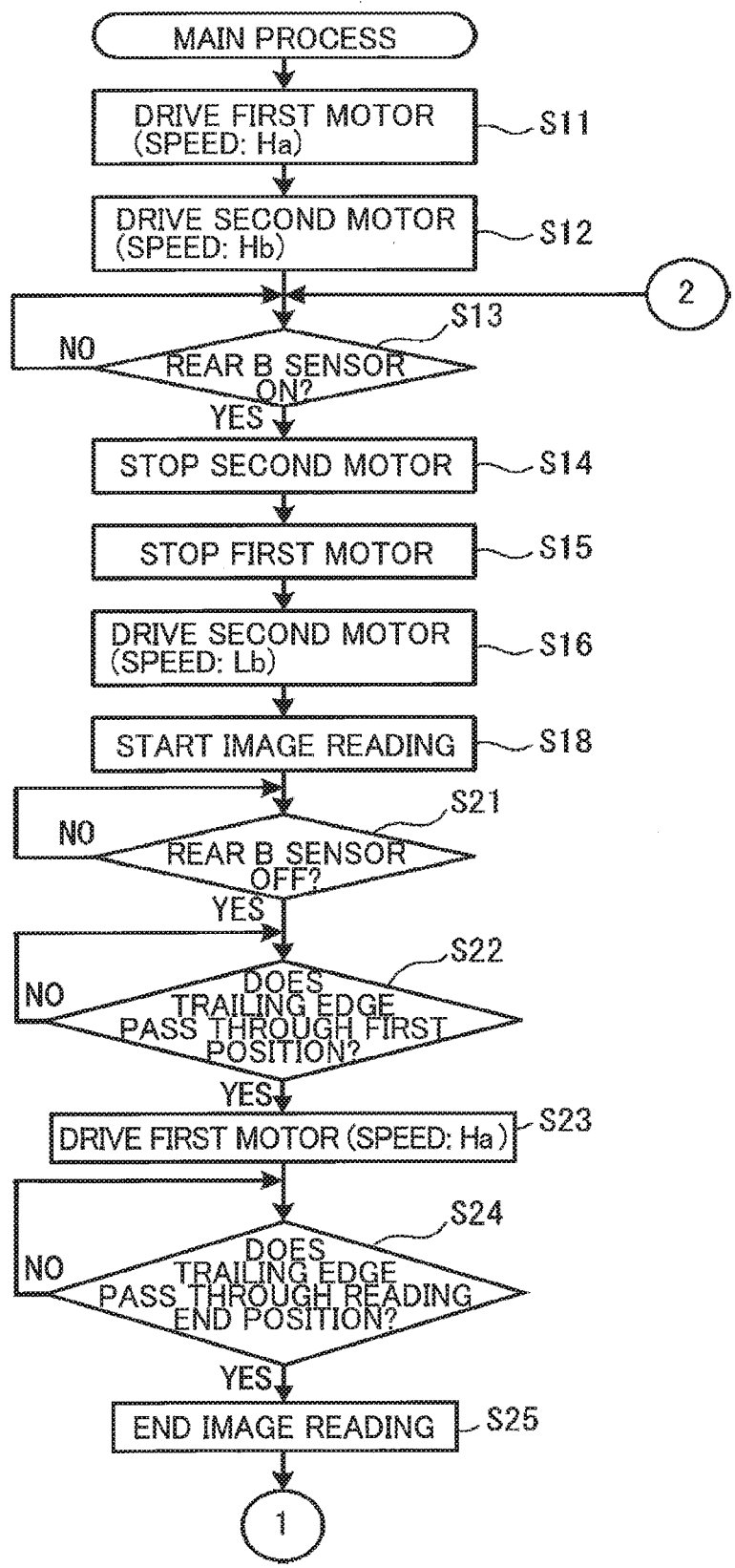
FIG. 3 is a flowchart illustrating a part of a main process according to the embodiment.

As shown in FIG. 3, when the main process is started, in S11 the CPU 51 transmits, to the first motor 71 via the controller 50, a drive start instruction for driving the first motor 71. When the first motor 71 begins to drive, a slow-up control, in which the frequency of the drive pulse increases gradually, is performed. In response to the drive start instruction from the CPU 51, the first motor 71 gradually increases the rotation speed by the slow-up control. After being driven by a prescribed number of steps required for the slow-up control, the first motor 71 rotates at a rotation speed so that the feed roller 41 rotates at the circumferential speed Ha The feed roller 41 is subjected to the slow-up control, that is, the feed roller 41 is gradually accelerated, according to the slow-up control of the first motor 71. Thus, the feed roller 41 rotates at a constant speed of the circumferential speed Ha (arrow 321 in FIG. 7).

In S12 the CPU 51 transmits, to drive the second motor 72 via the controller 50, a drive start instruction for driving the second motor 72 at the rotation speed so that the conveyance rollers 91 and 92 rotate at the circumferential speed Hb. In response to the drive start instruction from the CPU 51, the second motor 72 gradually increases the rotation speed by the slow-up control. After being driven by a prescribed number of steps required for the slow-up control, the second motor 72 rotates at the rotation speed so that the conveyance rollers 91 and 92 rotate at the circumferential speed Hb. The conveyance rollers 91 and 92 are subjected to the slow-up control, that is, the conveyance rollers 91 and 92 are gradually accelerated, according to the slow-up control of the second motor 72. Thus, the conveyance rollers 91 and 92 rotate counterclockwise at a constant speed of the circumferential speed Hb (arrow 323H in FIG. 7).

In a conceivable case where the drive of the second motor 72 is started after waiting for completion of the slow-up control of the first motor 71, the sheet 35 conveyed by the feed roller 41 would be conveyed to the conveyance rollers 91 and 92 in a state where the slow-up control of the conveyance rollers 91 and 92 is not completed. In order to prevent occurrence of such situation, in the embodiment, the drive start of the second motor 72 in S12 is performed at the same time as the drive start of the first motor 71 in S11 without waiting for completion of the slow-up control of the first motor 71.

Figure 7:
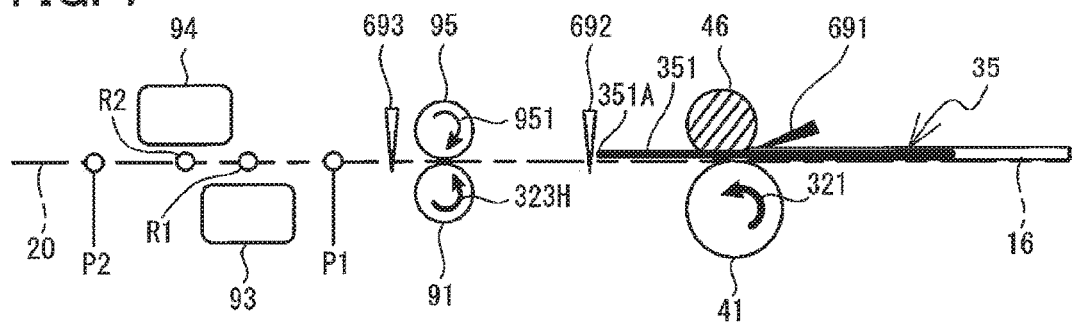

The follower roller 95 rotates clockwise to follow the conveyance roller 91 (arrow 951 in FIG. 7). When the reverse roller 46 receives the torque less than a prescribed threshold value according to the rotation of the feed roller 41, the reverse roller 46 rotates counterclockwise by the rotational force received from the shaft member 47. In this case, the circumferential speed of the reverse roller 46 when the second motor 72 rotates the conveyance rollers 91 and 92 at the circumferential speed Hb is higher than the circumferential speed of the reverse roller 46 when the second motor 72 rotates the conveyance rollers 91 and 92 at the circumferential speed Lb. Thus, the ratio of the circumferential speed of the reverse roller 46 to the circumferential speed Ha of the feed roller 41 is equal to or higher than a prescribed ratio, thereby maintaining good separation performance for separating the lowermost sheet 351 from the remaining sheets 35 by the rotations of the feed roller 41 and the reverse roller 46. As shown in FIG. 7, the sheet 351 separated from the remaining sheets 35 moves toward the conveyance rollers 91 and 92 along the conveyance path 20 according to the rotation (arrow 321) of the feed roller 41 at the circumferential speed Ha. Hereinafter, the rotation speed of the second motor 72 at which the conveyance rollers 91 and 92 rotate at the circumferential speed Hb is referred to as a "high speed." The rotation speed of the second motor 72 at which the conveyance rollers 91 and 92 rotate at the circumferential speed Lb is referred to as a "low speed." In FIG. 7, the reverse roller 46 is illustrated by prescribed first hatching, which schematically represents the separation performance of the reverse roller 46 that separates one sheet 351 from the remaining sheets 35 is good. Hereinafter, the sheet 351 is referred to as a "first sheet."

FIG. 8 shows a state where a trailing edge 351A of a sheet 351 passes through the position at which the rear A sensor 692 is disposed in the conveyance path 20 while the sheet 351 is conveyed downstream in the conveyance path 20 according to the rotation of the feed roller 41. In FIG. 8, the rear A sensor 692 is illustrated in black, which schematically represents that the rear A sensor 692 outputs the ON signal to the controller 50.

In S13 of FIG. 3, the CPU 51 determines whether the ON signal is output from the rear B sensor 693. When the ON signal is not output from the rear B sensor 693 (S13: NO), the CPU 51 repeatedly performs the determination of S13 until the ON signal is output from the rear B sensor 693, that is, until the leading edge 351A of the sheet 351 is detected by the rear B sensor 693.

When the ON signal is output from the rear B sensor 693 (S13: YES), that is, when the leading edge 351A of the sheet 351 is detected by the rear B sensor 693, in S14 the CPU 51 transmits, to the second motor 72 via the controller 50, a drive stop instruction for stopping the second motor 72. When the drive of the second motor 72 is stopped, a slow-down control, in which the frequency of the drive pulse gradually decreases, is performed. In response to the drive stop instruction from the CPU 51, the second motor 72 gradually decreases the rotation speed by the slow-down control. After being driven by a prescribed number of steps required for the slow-down, the second motor 72 stops. The conveyance rollers 91 and 92 are subjected to the slow-down, that is, the conveyance rollers 91 and 92 is gradually decelerated, according to the slow-down of the second motor 72. Accordingly, the conveyance rollers 91 and 92 stop the rotation thereof.

In S15 the CPU 51 transmits, to the first motor 71 via the controller 50, a drive stop instruction for stopping the first motor 71. In response to the drive stop instruction from the CPU 51, the first motor 71 gradually decreases the rotation speed by the slow-down control. After being driven by a prescribed number of steps required for the slow-down, the first motor 71 stops. The feed roller 41 is subjected to the slow-down, that is, the feed roller is gradually decelerated, according to the slow-down of the first motor 71. Accordingly, the feed roller 41 stops the rotation thereof. The stop of the first motor 71 in S15 is performed at the same time as the stop of the second motor 72 in S14 without waiting for completion of the slow-down of the second motor 72. The circumferential speed Hb of the conveyance rollers 91 and 92 before the second motor 72 is stopped is higher than the circumferential speed Ha of the feed roller 41 before the first motor 71 is stopped. Accordingly, the sheet 35 conveyed to the feed roller 41 does not come in contact with the sheet 351 conveyed to the conveyance rollers 91 and 92 even when the first motor 71 is stopped without waiting for completion of the slow-down of the second motor 72.

In S16 the CPU 51 transmits, to the second motor 72 via the controller 50, a drive start instruction for driving the second motor 72 at the low speed. In response to the drive start instruction from the CPU 51, the second motor 72 gradually increases the rotation speed by the slow-up control. After being driven by a prescribed number of steps required for the slow-up control, the second motor 72 rotates at the rotation speed so that the conveyance rollers 91 and 92 rotate at the circumferential speed Lb. The conveyance rollers 91 and 92 are subjected to the slow-up control, that is, the conveyance rollers 91 and 92 gradually is accelerated, according to the slow-up control of the second motor 72. Accordingly, the conveyance rollers 91 and 92 rotates counterclockwise at a constant speed of the circumferential speed Lb (arrow 323L). That is, in S14 the CPU 51 temporarily stops the second motor 72 that is driven at the high speed, and then in S16 restarts the second motor at the low speed. The CPU 51 can accurately switch to the frequency of the drive pulse of the second motor 72 for the lower speed by temporarily stopping the second motor 72 which is driven at the high speed for decelerating the second motor 72 from the high speed to the low speed. Accordingly, the image reading apparatus 1 can accurately switch the circumferential speed of the conveyance rollers 91 and 92 from Hb to Lb.

In the embodiment, the circumferential speed Lb of the conveyance rollers 91 and 92 indicates the circumferential speed of the conveyance rollers 91 and 92 while an image of the sheet 35 is read (image reading time). The CPU 51 performs the processes S14 and S16 before the image reading of the first sheet is started by the process S18 (described later). Accordingly, the circumferential speed of the conveyance rollers 91 and 92 accurately decreases from Hb to Lb before the image reading of the first sheet is started. The image reading of the first sheet, which is started by the process of S18, is likely to be performed to obtain a reading result with a uniform reading resolution, thereby reducing degrade of the quality of the reading result.

In a case where the second motor 72 decelerates at the image reading time of the first sheet, the circumferential speed of the conveyance rollers 91 and 92 decreases, the conveying speed of the first sheet passing through the first reading position R1 and the second reading position R2 decreases, and the number of read lines per unit length is changed due to the decrease of the conveying speed. In this case, in order to obtain the image reading result with a uniform reading resolution, a process such as correction of image data corresponding to the change in the conveying speed of the first sheet is additionally necessary. In the embodiment, by decelerating the second motor 72 before the image reading start of the first sheet, the circumferential speed of the conveyance rollers 91 and 92 is kept constant at Lb while the image of the first sheet is read. The image reading apparatus 1 can obtain the image reading result of the first sheet with a uniform reading resolution without using a particular process such as correction of image data even when the rotation speed of the second motor 72 decreases.

The circumferential speed Lb of the conveyance rollers 91 and 92 after the rotation speed of the second motor 72 decreases through the processes S14 and S16 is lower than the circumferential speed Ha of the feed roller 41 before the second motor is stopped by the process S15. In a case where the conveyance rollers 91 and 92 rotate at the decelerated circumferential speed Lb and the feed roller 41 continues to rotate at the circumferential speed Ha, there is a possibility that a subsequent sheet 35 newly conveyed by the feed roller 41 will come into contact with the sheet 351 conveyed by the conveyance rollers 91 and 92. Since the CPU 51 stops the first motor 71 by the process S15 at the time of decelerating the conveyance rollers 91 and 92 from the circumferential speed Hb to the circumferential speed Lb, the subsequent sheet 35 conveyed by the feed roller 41 can be prevented from coming into contact with the preceding sheet 351 conveyed by the conveyance rollers 91 and 92.

Figure 11:
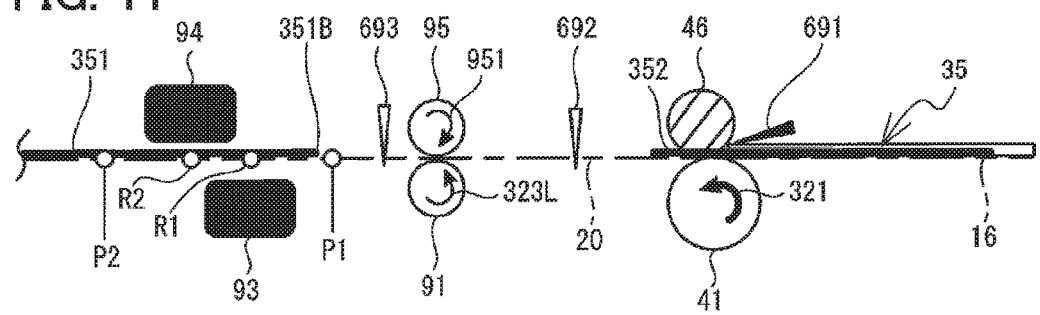

The CPU 51 decelerates the second motor 72 from the high speed to the low speed by the process S16. The circumferential speed of the reverse roller 46 when the second motor 72 rotates at the low speed is lower than the circumferential speed of the reverse roller 46 when the second motor 72 rotates at the high speed. After the second motor 72 is decelerated, the ratio of the circumferential speed of the reverse roller 46 to the circumferential speed of the feed roller 41 may not be equal to or greater than a prescribed ratio. In FIGS. 9 to 11, the reverse roller 46 is illustrated by second hatching different from the first hatching, which schematically represents that the separation performance of the reverse roller 46 is less than that when the reverse roller 46 is illustrated by the first hatching. Until the process S23 (described later) is performed after the second motor 72 is decelerated by the process S16, the feed roller 41 does not rotate, and separation and conveyance of the sheet 35 by the feed roller 41 and the reverse roller 46 are not performed. Accordingly, until the process S23 is performed after the process S16 is performed, the image reading apparatus 1 is not particularly affected by the degradation of the separation performance of the reverse roller 46.

In S18 the CPU 51 starts image reading of the sheet 351. As shown in FIG. 9, the conveyance roller 91 continues to rotate at the circumferential speed Lb corresponding to the reading resolution (arrow 323L) while the follower roller 95 and the conveyance roller 91 interpose the sheet 35 therebetween. According to the rotation of the conveyance roller 91, the sheet 351 is sequentially conveyed to the first reading position R1 of the first reader 93 and the second reading position R2 of the second reader 94. The CPU 51 transmits an image reading start instruction to the CIS 21A of the first reader 93 and the CIS 22B of the second reader 94. The first reader 93 and the second reader 94 convert the images of the sheet 351 read by the CISs 21A and 21B into respective image data using the AFEs 22A and 22B, and transmit the converted image data to the image data storage area 521 of the RAM 52 on a line-to-line basis. The CPU 51 starts storage of the image data in the image data storage area 521 of the RAM 52. In FIG. 9, the first reader 93 and the second reader 94 are illustrated in black, which schematically represent that the image reading by the first reader 93 and the second reader 94 is started.

In S21 (FIG. 3) the CPU 5 determines whether the OFF signal is output from the rear B sensor 693. When the OFF signal is not output from the rear B sensor 693 (S21: NO), the CPU 51 repeatedly performs the determination of S21 until the OFF signal is output from the rear B sensor 693, that is, until a trailing edge 351B of the sheet 351 passes through the position at which the rear B sensor 693 is disposed.

When the OFF signal is output from the rear B sensor 693 (S21: YES), that is, when the trailing edge 351B of the sheet 351 passes through the position at which the rear B sensor 693 is disposed, in S22 the CPU 51 determines whether the trailing edge 351B of the sheet 351 passes through the first position P1. The CPU 51 determines that the trailing edge 351B of the sheet 351 passes through the first position P1, when the second motor 72 is driven by a first prescribed number of steps from a timing when determining in S21 that the OFF signal is output from the rear B sensor 693. When the trailing edge 351B of the sheet 351 does not pass through the first position P1 (S22: NO), the CPU 51 repeatedly performs the determination of S22 until the trailing edge 351B passes through the first position P1, that is, until the second motor 72 is driven by the first prescribed number of steps after the OFF signal is output from the rear B sensor 693. While the determination of S21 and the determination of S22 are being repeated, the sheet 351 is sequentially conveyed to (or through) the first reading position R1 and the second reading position R2 according to the rotation of the conveyance roller 91 as shown in FIG. 10. The first reader 93 and the second reader 94 continue to read the images of the sheet 351.

When the trailing edge 351B of the sheet 351 passes through the first position P1 (S22: YES), that is, when the second motor 72 is driven by the first prescribed number of steps from the timing when the OFF signal is output from the rear B sensor 693, in S23 the CPU 51 transmits, to the first motor 71 via the controller 50, a drive start instruction for driving the first motor 71. In response to the drive start instruction from the CPU 51, the first motor 71 gradually increases the rotation speed by the slow-up control. After being driven by a prescribed number of steps required for the slow-up control, the first motor 71 rotates at the rotation speed so that the feed roller 41 rotates at the circumferential speed Ha.

That is, starting the first motor 71 is triggered by an event that the trailing edge 351B of the sheet 351 passes through the first position P1. Further, when the first motor 71 starts the rotation, the feed roller 41 starts rotating. The feed roller 41 is subjected to the slow-up control, that is, the feed roller 41 is gradually accelerated, according to the slow-up control of the first motor 71. Accordingly, the feed roller 41 rotates at a constant speed of the circumferential speed Ha. As shown in FIG. 11, the feed roller 41 rotates counterclockwise at the circumferential speed Ha, and the sheets 35 is placed on the top surface of the sheet feed tray 16. In this state, the feed roller 41 is in contact with one of the sheets 35 from the bottom side while the reverse roller 46 and the feed roller 41 interpose the sheets therebetween. When the reverse roller 46 rotates counterclockwise, the lowermost sheet 352 among the sheets 35 is separated from the remaining sheets. When the feed roller 41 continues to rotate counterclockwise, the sheet 352 is conveyed downstream in the conveyance path 20. Hereinafter, a "second sheet" indicates the sheet 352, which is newly conveyed subsequently to the first sheet by the feed roller 41 from upstream in the conveyance path 20 when the first sheet is conveyed by the conveyance rollers 91 and 92. Conveyance of the second sheet is started by the process S23.

The circumferential speed of the feed roller 41 when the second sheet is conveyed by the process S23 is the same circumferential speed Ha as the circumferential speed of the feed roller 41 before the drive of the first motor 71 is stopped by the process S15. That is, the circumferential speed of the feed roller 41 when the second sheet is conveyed is the same as that of the feed roller 41 when the first sheet is conveyed.

The image reading apparatus 1 can prevent unloaded feed of the second sheet similarly to the first sheet. The CPU 51 can start conveyance of the second sheet prior to the image reading end of the first sheet by performing the process S23 before the image reading of the first sheet ends. The image reading of the first sheet is ended by the process S25 described later. The image reading apparatus 1 can rapidly perform the image reading of all the sheets 35 by reducing a distance between the first sheet and the second sheet in comparison with a case in which the conveyance of the second sheet is started after waiting for the image reading end of the first sheet.

In S24 the CPU 51 determines whether the trailing edge 351B of the sheet 351 passes through the reading end position P2. When the second motor 72 is driven by a second prescribed number of steps which is greater than the first prescribed number of steps from a timing when determining in step S21 that the OFF signal is output from the rear B sensor 693, the CPU 51 determines that the trailing edge 351B of the sheet 351 passes through the reading end position P2. When the trailing edge 351B of the sheet 351 does not pass through the reading end position P2 yet (S24: NO), the CPU 51 repeatedly performs the determination of S24 until the trailing edge 351B of the sheet 351 passes through the reading end position P2, that is, until the second motor 72 is driven by the second prescribed number of steps from the timing when the OFF signal is output from the rear B sensor 693.

When the trailing edge 351B of the sheet 351 passes through the reading end position P2 (S24: YES), that is, when the second motor 72 is driven by the second prescribed number of steps from the timing when the OFF signal is output from the rear B sensor 693, in S25 the CPU 51 ends the image reading of the sheet 351. The CPU 51 transmits an image reading end instruction to the CIS 21A and the CIS 21B. The CPU 51 ends storage of image data in the image data storage area 521 of the RAM 52.

Figure 4:
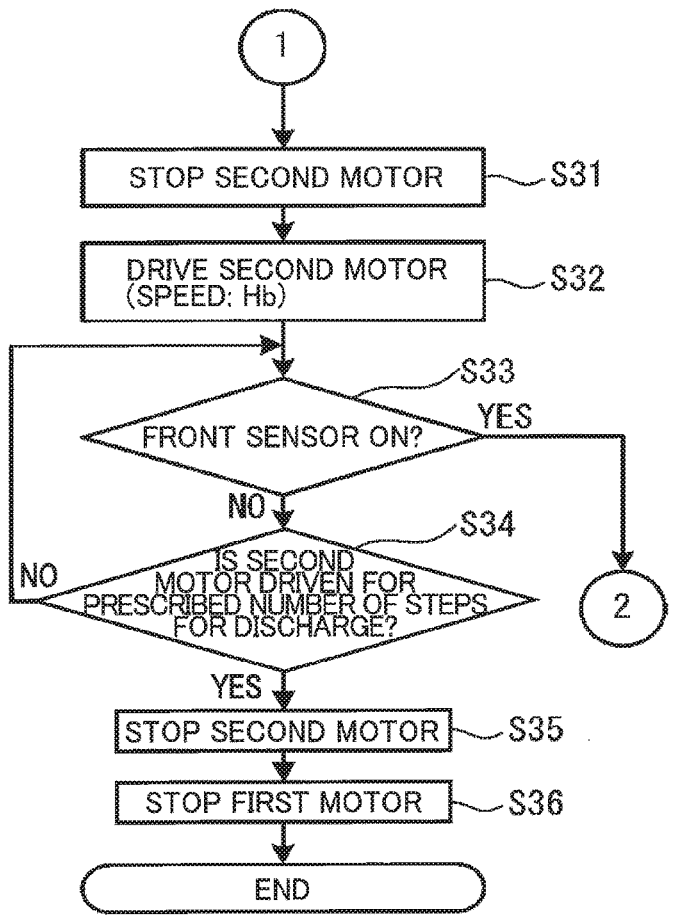
FIG. 4 is a flowchart illustrating a remaining part of the main process shown in FIG. 3.

As shown in FIG. 4, in S31 the CPU 51 transmits, to the second motor 72 via the controller 50, an instruction for stopping the second motor 72. In S32 the CPU 51 transmits, to the second motor 72 via the controller 50, an instruction for driving the second motor 72 at the high speed. The second motor 72 reaches a high rotation speed by the slow-up control. The conveyance rollers 91 and 92 are subjected to the slow-up control, that is, the conveyance rollers 91 and 92 are gradually accelerated, according to the slow-up control of the second motor 72. Accordingly, the conveyance rollers 91 and 92 rotates counterclockwise at a constant speed of the circumferential speed Hb (arrow 323H in FIG. 12). The CPU 51 in S31 temporarily stops the second motor 72 which is driven at the low speed, then restarts the second motor 72 so as to switch the rotation speed thereof to the high speed by the process S32. When the CPU 51 temporarily stops the second motor 72 in accelerating the second motor 72 from the low speed to the high speed, the frequency of the drive pulse of the second motor 72 can be accurately switched, and thus the circumferential speed of the conveyance rollers 91 and 92 can be accurately switched from Lb to Hb.

Figure 12:
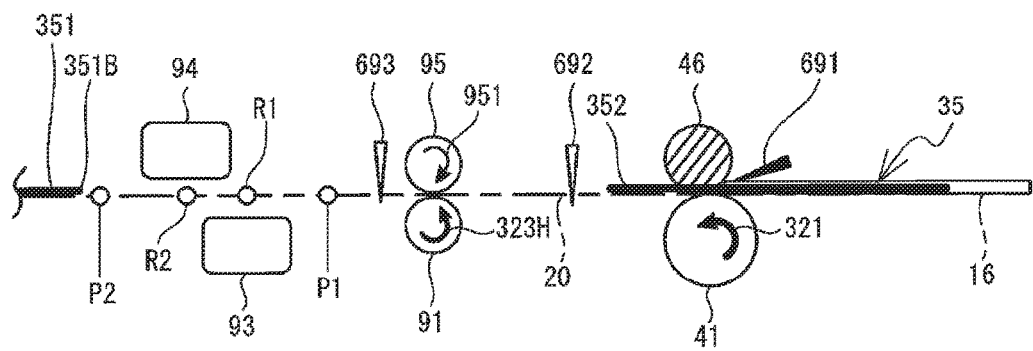

As shown in FIG. 12, the first sheet is conveyed downstream in the conveyance path 20 according to the rotation of the conveyance rollers 91 and 92. Subsequently, the first sheet is discharged from the sheet outlet 10B (see FIG. 1). The image reading apparatus 1 can quickly discharge, from the conveyance path 20, the first sheet for which the image reading is completed by increasing the circumferential speed of the conveyance rollers 91 and 92 from Lb to Hb after the image reading of the first sheet is completed.

By this time, the feed roller 41 continues to convey the second sheet after the process S23. When the process S23 is performed, the second motor 72 is driven at the low speed and the separation performance of the reverse roller 46 is temporarily decreased (see FIG. 11). Thereafter, when the image reading of the first sheet is ended, the rotation speed of the second motor 72 is increased from the low speed to the high speed by the process S32. Because the rotation speed of the second motor 72 increases from the low speed to the high speed, the circumferential speed of the reverse roller 46 increases due to the rotational force transmitted from the shaft member 47 provided that the reverse roller 46 rotates counterclockwise. After the second motor 72 is accelerated, the ratio of the circumferential speed of the reverse roller 46 to the circumferential speed Ha of the feed roller 41 is equal to or greater than the prescribed ratio, and thus the separation performance of the reverse roller 46 is improved than that before the second motor 72 is accelerated. The separation performance of the reverse roller 46 at this time is the same as the separation performance of the reverse roller 46 at the time of S12 where the feed roller 41 rotates at the circumferential speed Ha, the second motor 72 is driven at the high speed, and the first sheet is separated from the remaining sheets 35 and is conveyed. The image reading apparatus 1 can ensure the separation performance of the reverse roller 46 for separating the second sheet similarly to the first sheet. Accordingly, conveyance of the second sheet in the conveyance path 20 is smoothly performed by the feed roller 41. The image reading apparatus 1 can smoothly convey the second sheet using the feed roller 41 by shortening the period in which the separation performance of the reverse roller 46 decreases so as to be a short period immediately after conveyance of the second sheet is started.

In a case where the second motor 72 is accelerated at the image reading time of the first sheet, the conveying speed of the first sheet passing through the first reading position R1 and/or the second reading position R2 increases and the number of read lines per unit length is changed with the increase of the conveying speed. In this case, in order to obtain the image reading result with a uniform reading resolution, a process such as correction of image data corresponding to the change of the conveying speed of the first sheet is additionally necessary. In the embodiment, since the second motor 72 is accelerated after the image reading of the first sheet is ended, the circumferential speed of the conveyance rollers 91 and 92 is kept constant at Lb at the image reading time of the first sheet. Accordingly, the image reading apparatus 1 can obtain the image reading result of the first sheet with a uniform reading resolution without using a particular process such as correction of image data even when the rotation speed of the second motor 72 increases.

Returning to FIG. 4, in S33 the CPU 51 determines whether the ON signal is output from the front sensor 691. When the ON signal is output from the front sensor 691 (S33: YES), the sheet 35 is placed on the sheet feed tray 16 and the CPU 51 returns to S13 (see FIG. 3) for the purpose of image reading subsequent to the second sheet. When the ON signal is not output from the front sensor 691 (S38: NO), in S34 the CPU 51 determines whether the second motor 72 is driven by a prescribed number of steps required for discharging the first sheet from the sheet outlet 10B. When the second motor 72 is not driven by the prescribed number of steps required for discharging the first sheet from the sheet outlet 10B (S34: NO), the CPU 51 returns to the determination of S33 and repeatedly performs the determinations of S33 and S34.

When the second motor 72 is driven by a prescribed number of steps required for discharging the first sheet from the sheet outlet 10B (S34: YES), in S35 the CPU 51 transmits, to the second motor 72 via the controller 50, an instruction for stopping the second motor 72. In S36 the CPU 51 transmits, to the second motor 72 via the controller 50, an instruction for stopping the first motor 71 and ends the main process.

As described above, when the ON signal is output from the rear B sensor 693 (S13: YES) in the state where the first motor 71 and the second motor 72 are driven by the processes S11 and S12, the CPU 51 transmits, to the second motor 72, an instruction to stop the drive of the second motor 72 (S14). In addition, the CPU 51 transmits, to the first motor 71, an instruction to stop the first motor 71 (S15). The CPU 51 decreases the drive speed of the second motor 72 from a high speed to a low speed by transmitting, to the second motor 72, an instruction to drive the second motor 72 at a low speed (S16). Thereafter, when the OFF signal is output from the rear B sensor 693 (S21: YES) and when the trailing edge 351B of the sheet 351 passes through the first position P1 (S22: YES), the CPU 51 transmits, to the first motor 71, an instruction to drive the first motor 71 (S23). Subsequently to the sheet 351 (the first sheet), conveyance of the sheet 352 (the second sheet) is started toward downstream side in the conveyance path 20. The CPU 51 performs the process S23 before the image reading end of the first sheet (S24). Accordingly, the CPU 51 can start conveyance of the second sheet at a timing prior to the image reading end of the first sheet. The image reading apparatus 1 can shorten the time period required for reading of all the plurality of sheets 35. When the trailing edge 351B of the first sheet passes through the reading end position P2 (S24: YES), the CPU 51 temporarily stops the second motor 72 which is driven at a low speed (S31) and then restarts the second motor 72 at a high speed (S32). The image reading apparatus 1 can rapidly discharge the first sheet of which the image reading has been ended from the conveyance path 20 by increasing the circumferential speed of the conveyance rollers 91 and 92 from Lb to Hb. By increasing the drive speed of the second motor 72 to a high speed, the ratio of the circumferential speed of the reverse roller 46 to the circumferential speed Ha of the feed roller is equal to or greater than the prescribed ratio. The separation performance of the reverse roller 46 is more improved than in a case where the second motor 72 is driven at a low speed. The image reading apparatus 1 can ensure the separation performance of the reverse roller 46 and efficiently read images of plurality of sheets 35.

The rotation speed of the second motor 72 decreases from a high speed to a low speed by the process S16. The circumferential speed of the conveyance rollers 91 and 92 becomes Lb. The circumferential speed Ha when the feed roller is driven is higher than the circumferential speed Lb. In a conceivable case where the feed roller 41 continues to rotate at the circumferential speed Ha in this state, there is a possibility that a subsequent sheet 35 which is newly conveyed by the feed roller 41 will collide with the sheet 351 conveyed by the conveyance rollers 91 and 92. The CPU 51 stops the drive of the first motor 71 by the process S15 together with the deceleration of the second motor 72 by the process S16. Accordingly, even when the second motor 72 is decelerated by the process S16, the second sheet can be prevented from colliding with the first sheet in the conveyance path 20.

When the circumferential speed of the feed roller 41 is lower than a prescribed circumferential speed, the conveying force of the sheet 35 by the rotation of the feed roller 41 may be insufficient and unloaded feed of the sheet 35 may occur. When the first motor 71 is driven by the process S23, the CPU 51 drives the first motor 71 at the rotation speed so that the feed roller 41 rotates at the circumferential speed Ha. The rotation speed of the first motor 71 at this time is the same as the rotation speed of the first motor 71 before the first motor is stopped by the process S15. That is, the circumferential speed of the feed roller 41 when the second sheet is conveyed by the process S23 is the same as the circumferential speed Ha of the feed roller 41 before the drive of the first motor 71 is stopped by the process S15. Accordingly, the image reading apparatus 1 can prevent unloaded feed from occurring at the time of conveyance of the second sheet to the same degree as at the time of conveyance of the first sheet. The rotation speed of the second motor 72 is increased from a low speed to a high speed by the process S32. The increased rotation speed of the second motor 72 is the same as the rotation speed of the second motor 72 before the second motor is decelerated from a high speed to a low speed by the process S16. That is, the increased rotation speed of the second motor 72 is the rotation speed so that the conveyance rollers 91 and 92 rotate at the circumferential speed Hb. The conveyance rollers 91 and 92 and the reverse roller 46 rotate by the rotation driving force transmitted from the second motor 72. After the rotation speed of the second motor 72 is increased from a low speed to a high speed by the process S32, the circumferential speed of the reverse roller 46 increases in a case where the reverse roller 46 rotates counterclockwise by the rotation driving force received from the shaft member 47. Since the ratio of the circumferential speed of the reverse roller 46 to the circumferential speed Ha of the feed roller is equal to or greater than the prescribed ratio, the separation performance of the reverse roller 46 is improved. In conveying the second sheet after the image reading of the first sheet is ended, the image reading apparatus 1 can ensure the separation performance of the reverse roller 46 at the time of separating the second sheet from remaining sheets to the same degree as at the time of separating the first sheet from remaining sheets.

The CPU 51 decelerates the second motor 72 which is driven at a high speed by the process S12, so as to drive the second motor at a low speed by the processes S14 and S16. Subsequently, the CPU 51 starts the image reading of the first sheet (S18). According to the deceleration of the second motor 72, the circumferential speed of the conveyance rollers 91 and 92 conveying the first sheet decreases from Hb to Lb. Subsequently, the image reading of the first sheet is started. At the image reading time of the first sheet, the conveyance rollers 91 and 92 rotate at the circumferential speed Lb corresponding to the reading resolution of the reading result. Accordingly, the image reading apparatus 1 can obtain the image reading result of the first sheet with a uniform reading resolution without using a particular process such as correction of image data even when the rotation speed of the second motor 72 decreases.

The CPU 51 temporarily stops the second motor 72 which is driven at a high speed by the process S14, then restarts the second motor so as to switch the rotation speed thereof to a low speed by the process S16. In decelerating the second motor 72 from a high speed to a low speed, the CPU 51 can accurately switch the frequency of the drive pulse of the second motor 72 so as to correspond to a low speed by temporarily stopping the second motor 72 which is driven at a high speed. Accordingly, the image reading apparatus 1 can accurately switch the circumferential speed of the conveyance rollers 91 and 92 from Hb to Lb. Since the first sheet is conveyed to (or through) the first reading position R1 and the second reading position R2 by the conveyance rollers 91 and 92 which stably rotate at the circumferential speed Lb, the reading result of the first sheet can be obtained with a uniform reading resolution.

The CPU 51 starts the image reading of the first sheet (S18). Thereafter, the CPU 51 transmits, to the first motor 71, an instruction to drive the first motor 71 (S23). Accordingly, conveyance of the second sheet is started. When the trailing edge 351B of the first sheet passes through the reading end position P2 (S24: YES), the CPU 51 ends the image reading of the first sheet (S25). Thereafter, the CPU 51 accelerates the second motor 72, which is driven at a low speed by the process S16, to drive the second motor at a high speed by the processes S31 and S32. After the image reading of the first sheet is ended, the circumferential speed of the conveyance rollers 91 and 92 conveying the first sheet increases from Lb to Hb according to the acceleration of the second motor 72. Accordingly, at the image reading time of the first sheet, the rotation speed of the conveyance rollers 91 and 92 is kept at the circumferential speed Lb corresponding to the reading resolution of the reading result. Accordingly, the image reading apparatus 1 can obtain the image reading result of the first sheet with a uniform reading resolution without using a particular process such as correction of image data even when the rotation speed of the second motor 72 increases.

The CPU 51 temporarily stops the second motor 72 which is driven at a low speed in the process S31, and restart the second motor so as to switch the rotation speed of the second motor to a high speed in the process S32. In accelerating the second motor 72 from a low speed to a high speed, the CPU 51 can accurately switch the frequency of the drive pulse of the second motor 72 so as to correspond to a high speed by temporarily stopping the second motor 72 which is driven at a low speed. Subsequently, the first sheet is conveyed according to the rotation of the conveyance rollers 91 and 92 at the circumferential speed Ha and is rapidly discharge from the sheet outlet 10B. By increasing the rotation speed of the second motor 72 from a low speed to a high speed, the circumferential speed of the reverse roller 46 increases in a case where the reverse roller 46 rotates counterclockwise by the rotation driving force received from the shaft member 47. Since the ratio of the circumferential speed of the reverse roller 46 to the circumferential speed Ha of the feed roller 41 is equal to or greater than the prescribed ratio, the separation performance of the reverse roller 46 is improved. In conveying the second sheet after the image reading of the first sheet is ended, the image reading apparatus 1 can ensure the separation performance of the reverse roller 46 at the time of separating the second sheet from remaining sheets to the same degree as at the time of separating the first sheet from remaining sheets.

While the disclosure has been described in detail with reference to the above embodiments thereof, it would be apparent to those skilled in the art that various changes and modifications may be made therein.

In the above described embodiment, a destination of the respective image data outputted from the first reader 93 and the second reader 94 is the image data storage area 521 of the RAM 52 in the controller 50, but the destination may not be disposed in the controller 50.

In the above described embodiment, in the image reading apparatus 1, an image of the top surface of a sheet 35 and an image of the bottom surface of the sheet 35 can be read by one time of conveyance by the first reader 93 and the second reader 94. The image reading apparatus 1 may have a configuration including any one of the first reader 93 and the second reader 94.

In the above described embodiment, when the instruction to drive the first motor 71 is transmitted to the first motor 71 in the process S11 or when the instruction to drive the first motor 71 is transmitted to the first motor 71 in the process S23, the rotation speed thereof reaches the rotation speed at which the feed roller 41 rotates at the circumferential speed Ha. The circumferential speed of the feed roller 41 until the process S15 is performed after the process S11 is set to be equal to the circumferential speed of the feed roller 41 after the process S23. Here, circumferential speed of the feed roller 41 until the process S15 is performed after the process S11 may be strictly equal to the circumferential speed of the feed roller 41 after S23, these circumferential speeds of the feed roller 41 may be strictly equal to the circumferential speed Ha, or at least one of these circumferential speeds of the feed roller 41 may have a minute error from Ha as a result of that the first motor 71 rotates at the rotation speed so that the feed roller 41 rotates at the circumferential speed Ha. When the instruction to drive the second motor 72 is transmitted to the second motor 72 from the CPU 51 in the process S12 or when the instruction to drive the second motor 72 is transmitted to the second motor 72 in the process S32, the rotation speed of the second motor 72 reaches a speed at which the conveyance rollers 91 and 92 rotate at the circumferential speed Hb. The circumferential speed of the conveyance rollers 91 and 92 until the process S14 is performed after the process S12 is equal to the circumferential speed of the conveyance rollers 91 and 92 after the process of S32. Here, the circumferential speed of the conveyance rollers 91 and 92 until the process S14 is performed after the process S12 may be strictly equal to the circumferential speed of the conveyance rollers 91 and 92 after the process of S32, the circumferential speed of the conveyance rollers 91 and 92 may be strictly equal to the circumferential speed Hb, or at least one of the circumferential speed of the conveyance rollers 91 and 92 until the process S14 is performed after the process S12 and the circumferential speed of the conveyance rollers 91 and 92 after the process of S32 may have a minute error from Hb as a result of that the second motor 72 rotates at a high speed.

In the above described embodiment, the image reading apparatus 1 controls the second motor 72 so that the circumferential speed of the conveyance rollers 91 and 92 is Lb at the image reading time, but the image reading apparatus 1 may control the second motor 72 so that the circumferential speed of the conveyance rollers 91 and 92 is a circumferential speed other than Lb at the image reading time. The image reading apparatus 1 may have a plurality of reading modes for obtaining, from the images of the sheets 35, a reading result with a reading resolution higher or lower than that in the above described embodiment.

In the above described embodiment, the first reader 93 and the second reader 94 includes the CISs 21A and 21B and the AFEs 22A and 22B. For example, the first reader 93 and the second reader 94 may include only the CISs 21A and 21B respectively, and a circuit for converting analog images read by the CISs 21A and 21B into digital image data may be provided in the controller 50.

In the above described embodiment, the first motor 71 and the second motor 72 are stepping motors, but the present disclosure is not limited to this configuration. The first motor 71 and the second motor 72 may be DC motors or other motors.

The main process may be distributed and processed by a plurality of electronic apparatuses (that is, a plurality of CPUs). For example, at least part of the main process may be performed by an external apparatus connected to Internet or LAN. The program may be downloaded from an external apparatus such as a server connected to Internet or LAN and may be stored in the ROM 53 of the image reading apparatus 1, for example.

Part of the configuration of the invention implemented in hardware in the embodiment described above may be replaced by software and, conversely, part of the configuration of the invention implemented in software may be replaced by hardware.

What is claimed is:

1. An image reading apparatus comprising:
    a first motor;
    a second motor;
    a feed roller configured to rotate in a rotational direction by torque generated by the first motor so as to convey a sheets in a conveyance direction;
    a reverse roller configured to be in peripheral contact with the feed roller, and configured to rotate in the rotational direction by torque received from the second motor via a torque limiter;
    a conveyance roller disposed downstream of the feed roller in the conveyance direction, and configured to rotate in the rotational direction by torque from the second motor so as to convey the sheet from the feed roller in the conveyance direction, a circumferential speed of the conveyance roller varying depending on a circumferential speed of the reverse roller;
    a reader disposed downstream of the conveyance roller in the conveyance direction and configured to read an image on the sheet at a reading position;
    a detector disposed between the conveyance roller and the reading position in the conveyance direction and configured to detect the sheet; and
    a controller comprising hardware configured to perform processes comprising:
    a first drive process in which the controller is configured to control the first motor to rotate the feed roller with a circumferential speed of a first speed, and the second motor to rotate the conveyance roller with a circumferential speed of a second speed, wherein the reverse roller is configured to be rotated with a circumferential speed of a third speed in the first drive process so that the reverse roller has a first separation performance for separating a sheet from other sheets, which are in an overlapped state, together with the feed roller with the circumferential speed of the first speed, wherein the feed roller conveys a specific sheet in the conveyance direction through the first drive process;
    a second drive process in which, in response to detection of a leading edge of the specific sheet by the detector after performing the first drive process, the controller is configured to stop the first motor, and to decelerate the second motor to rotate the conveyance roller with the circumferential speed of a fourth speed slower than both the first speed and the second speed, wherein when the circumferential speed of the conveyance roller is the fourth speed in the second drive process, the reverse roller is configured to be rotated with the circumferential speed of a fifth speed so that the reverse roller has a second separation performance for separating a sheet from other sheets which are in an overlapped state, wherein the fifth speed is slower than the third speed and the second separation performance is lower than the first separation performance, wherein the conveyance roller conveys the specific sheet through the second drive process;
    a third drive process in which, in response to conveying the specific sheet through the second drive process so that a trailing edge of the specific sheet reaches a first position after the detector detects the trailing edge of the specific sheet, the controller is configured to control the first motor to start rotating the feed roller with the circumferential speed of the first speed, wherein the first position is located between the detector and the reading position, and the first position is separated from the detector by a prescribed distance; and
    a fourth drive process in which, in response to passage of the trailing edge of the specific sheet through a reading end position after performing the third drive process, the controller is configured to accelerate the second motor to rotate the conveyance roller with the circumferential speed of the second speed while the circumferential speed of the feed roller is maintained to the first speed, the reading end position being downstream of the first position in the conveyance direction.

2. The image reading apparatus according to claim 1, wherein the processes further comprise a reading process in which the controller controls the reader to start reading the image of the specific sheet after the second motor is decelerated through the second drive process.

3. The image reading apparatus according to claim 2, wherein the second drive process includes:
    a first stop process in which the controller stops both the first motor and the second motor when the detector detects the leading edge of the specific sheet that is conveyed while the first motor and the second motor rotate; and
    a first acceleration process in which the controller controls the second motor, which is stopped through the first stop process, to start rotating the conveyance roller with the circumferential speed of the fourth speed,
    wherein in the reading process the reader starts reading the image of the specific sheet after the circumferential speed of the conveyance roller is the fourth speed through the first acceleration process.

4. The image reading apparatus according to claim 2, wherein the processes further comprise a reading end process in which, in response to passage of the trailing edge of the specific sheet through the reading end position, the controller controls the reader to finish reading the image of the specific sheet before the second motor is accelerated through the fourth drive process.

5. The image reading apparatus according to claim 4, wherein the second drive process includes:
    a first stop process in which the controller stops both the first motor and the second motor when the detector detects the leading edge of the specific sheet that is conveyed while the first motor and the second motor rotate; and
    a first acceleration process in which the controller controls the second motor, which is stopped through the first stop process, to start rotating the conveyance roller with the circumferential speed of the fourth speed,
    wherein the fourth drive process includes:

a second stop process in which the controller stops the second motor after the reader finishes reading the image of the specific sheet through the reading end process; and a second acceleration process in which the controller controls the second motor, which is stopped through the second stop process, to start rotating the conveyance roller with the circumferential speed of the second speed.

6. The image reading apparatus according to claim 1, wherein the reader comprises:
   a first reader configured to read an image on one side of the sheet at a first reading portion, the first position being positioned between the detector and the first reading portion in the conveyance direction; and
   a second reader configured to read an image on the other side of the sheet at a second reading portion downstream of the first reading position in the conveyance direction, the reading end position being positioned downstream of the second reading portion in the conveyance direction.

7. A method comprising:
   a first drive step to control a first motor of an image reading apparatus to rotate a feed roller with a circumferential speed of a first speed, and a second motor of the image reading apparatus to rotate a conveyance roller with a circumferential speed of a second speed, wherein a reverse roller is configured to be rotated with the circumferential speed of a third speed in the first drive step so that the reverse roller has a first separation performance for separating a sheet from other sheets, which are in an overlapped state, together with the feed roller with the circumferential speed of the first speed, wherein the feed roller conveys the specific sheet in a conveyance direction through the first drive step, wherein the image reading apparatus includes: the first motor; the second motor; the feed roller configured to rotate in a rotational direction by torque generated by the first motor so as to convey a sheet in the conveyance direction; the reverse roller in peripheral contact with the feed roller, and configured to rotate in the rotational direction by torque received from the second motor via a torque limiter; the conveyance roller disposed downstream of the feed roller in the conveyance direction, and configured to rotate in the rotational direction by torque from the second motor so as to convey the sheet from the feed roller in the conveyance direction, the circumferential speed of the conveyance roller varying depending on a circumferential speed of the reverse roller; a reader disposed downstream of the conveyance roller in the conveyance direction and configured to read an image on the sheet at a reading position; and a detector disposed between the conveyance roller and the reading position in the conveyance direction and configured to detect the sheet;

a second drive step, in response to detection of a leading edge of the specific sheet by the detector after performing the first drive step, to stop the first motor, and to decelerate the second motor to rotate the conveyance roller with the circumferential speed of a fourth speed slower than both the first speed and the second speed, wherein when the circumferential speed of the conveyance roller is the fourth speed in the second drive step, the reverse roller is configured to be rotated with the circumferential speed of a fifth speed so that the reverse roller has a second separation performance for separating a sheet from other sheets which are in an overlapped state, wherein the fifth speed is slower than the third speed and the second separation performance is lower than the first separation performance, wherein the conveyance roller conveys the specific sheet through the second drive step;

a third drive step, in response to conveying the specific sheet through the second drive step so that a trailing edge of the specific sheet reaches a first position after the detector detects the trailing edge of the specific sheet, to control the first motor to start rotating the feed roller with that the circumferential speed of the first speed, wherein the first position is located between the detector and the reading position, and the first position is separated from the detector by a prescribed distance; and a fourth drive step, in response to passage of the trailing edge of the specific sheet through a reading end position after performing the third drive step, to accelerate the second motor to rotate the conveyance roller with the circumferential speed of the second speed while the circumferential speed of the feed roller is maintained to the first speed, the reading end position being downstream of the first position in the conveyance direction.

* * * * *

UNITED STATES PATENT AND TRADEMARK OFFICE
CERTIFICATE OF CORRECTION

PATENT NO. : 9,873,577 B2
APPLICATION NO. : 15/232078
DATED : January 23, 2018
INVENTOR(S) : Takaaki Mukai Page 1 of 1

It is certified that error appears in the above-identified patent and that said Letters Patent is hereby corrected as shown below:

In the Claims

Column 25, Claim 1, Line 25 should be corrected to read:
a sheet in a conveyance direction;

Signed and Sealed this
Twenty-ninth Day of May, 2018

Andrei Iancu
*Director of the United States Patent and Trademark Office*